(12) United States Patent
Dawar et al.

(10) Patent No.: US 9,574,469 B2
(45) Date of Patent: *Feb. 21, 2017

(54) CRANKCASE VENTILATION SELF-CLEANING COALESCER WITH INTERMITTENT ROTATION

(71) Applicant: CUMMINS FILTRATION IP, INC., Columbus, IN (US)

(72) Inventors: Saru Dawar, McFarland, WI (US); Scott W. Schwartz, Cottage Grove, WI (US); Brian W. Schwandt, Fort Atkinson, WI (US); Barry Mark Verdegan, Stoughton, WI (US)

(73) Assignee: CUMMINS FILTRATION IP, INC, Columbus, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/526,257

(22) Filed: Oct. 28, 2014

(65) Prior Publication Data

US 2015/0047582 A1 Feb. 19, 2015

Related U.S. Application Data

(63) Continuation of application No. 13/752,535, filed on Jan. 29, 2013, now Pat. No. 8,893,689, and a (Continued)

(51) Int. Cl.
*F02B 25/06* (2006.01)
*F01M 13/04* (2006.01)
(Continued)

(52) U.S. Cl.
CPC ............ *F01M 13/04* (2013.01); *F02M 25/06* (2013.01); *F01M 2001/1021* (2013.01);
(Continued)

(58) Field of Classification Search
CPC .......... F01M 13/04; F01M 2001/1021; F01M 2013/0422; F01M 2013/0438; F02M 25/06
(Continued)

(56) References Cited

U.S. PATENT DOCUMENTS

| 630,365 A | 8/1899 | Laplace |
| 881,723 A | 3/1908 | Scheibe |

(Continued)

FOREIGN PATENT DOCUMENTS

| BE | 1011567 | 11/1999 |
| CN | 1671952 | 9/2005 |

(Continued)

OTHER PUBLICATIONS

Example of Simplified Squirrel Cage Motor, www.animations.physics.unsw.edu.au, p. 5, website visited Apr. 25, 2011.
(Continued)

*Primary Examiner* — Marguerite McMahon
*Assistant Examiner* — Tea Holbrook
(74) *Attorney, Agent, or Firm* — Foley & Lardner LLP

(57) ABSTRACT

A method and system is provided for regenerating and cleaning an air-oil coalescer of a crankcase ventilation system of an internal combustion engine generating blowby gas in a crankcase. The coalescer coalesces oil from the blowby gas. The method and system includes regenerating and cleaning the coalescer by intermittent rotation thereof.

26 Claims, 18 Drawing Sheets

Related U.S. Application Data continuation-in-part of application No. 12/969,755, filed on Dec. 16, 2010, now Pat. No. 8,807,097, and a continuation-in-part of application No. 12/969,742, filed on Dec. 16, 2010, now Pat. No. 8,794,222.

(60) Provisional application No. 61/298,630, filed on Jan. 27, 2010, provisional application No. 61/298,635, filed on Jan. 27, 2010, provisional application No. 61/359,192, filed on Jun. 28, 2010, provisional application No. 61/383,793, filed on Sep. 17, 2010, provisional application No. 61/383,790, filed on Sep. 17, 2010, provisional application No. 61/383,787, filed on Sep. 17, 2010.

(51) Int. Cl.
*F02M 25/06* (2016.01)
*F01M 13/00* (2006.01)
*F01M 1/10* (2006.01)

(52) U.S. Cl.
CPC ............ *F01M 2013/0072* (2013.01); *F01M 2013/0422* (2013.01); *F01M 2013/0438* (2013.01); *Y02T 10/121* (2013.01)

(58) Field of Classification Search
USPC ...................................... 123/572–574, 41.86
See application file for complete search history.

(56) References Cited

U.S. PATENT DOCUMENTS

| | | | | |
|---|---|---|---|---|
| 1,306,421 | A | 6/1919 | Feltz | |
| 2,104,683 | A | 1/1938 | Rosen et al. | |
| 2,443,875 | A * | 6/1948 | Spangenberger | 123/196 A |
| 2,553,742 | A | 5/1951 | Bloch | |
| 2,713,960 | A | 7/1955 | Siegal | |
| 2,714,960 | A | 8/1955 | Schmid | |
| 2,795,291 | A | 6/1957 | Pierce | |
| 3,073,516 | A | 1/1963 | Glasson | |
| 3,234,716 | A | 2/1966 | Sevin et al. | |
| 3,289,397 | A | 12/1966 | Schonewald et al. | |
| 3,299,335 | A | 1/1967 | Johannes | |
| 3,333,703 | A | 8/1967 | Scavuzzo | |
| 3,343,342 | A | 9/1967 | Du | |
| 3,363,771 | A | 1/1968 | Walters | |
| 3,447,290 | A | 6/1969 | Flory | |
| 3,631,272 | A | 12/1971 | Kirii et al. | |
| 3,680,305 | A | 8/1972 | Miller | |
| 3,753,492 | A | 8/1973 | Aiello et al. | |
| 3,857,687 | A | 12/1974 | Hamilton et al. | |
| 3,935,487 | A | 1/1976 | Czerniak | |
| 4,138,234 | A | 2/1979 | Kubesa | |
| 4,189,310 | A | 2/1980 | Hotta | |
| 4,222,755 | A | 9/1980 | Grotto | |
| 4,223,909 | A | 9/1980 | Danner et al. | |
| 4,249,221 | A | 2/1981 | Cox et al. | |
| 4,288,030 | A * | 9/1981 | Beazley | 494/49 |
| 4,298,465 | A | 11/1981 | Druffel | |
| 4,302,517 | A | 11/1981 | Dziak | |
| 4,311,933 | A | 1/1982 | Riggs et al. | |
| 4,329,968 | A | 5/1982 | Ishikawa et al. | |
| 4,411,675 | A | 10/1983 | De Castella | |
| 4,482,365 | A * | 11/1984 | Roach | 96/408 |
| 4,561,409 | A | 12/1985 | Fernandez | |
| 4,643,158 | A | 2/1987 | Giannotti | |
| 4,714,139 | A | 12/1987 | Lorenz et al. | |
| 4,871,455 | A | 10/1989 | Terhune et al. | |
| 4,908,050 | A | 3/1990 | Nagashima et al. | |
| 4,922,604 | A | 5/1990 | Marshall et al. | |
| 4,946,483 | A | 8/1990 | Coral | |
| 4,981,502 | A | 1/1991 | Gottschalk | |
| 5,035,797 | A | 7/1991 | Janik | |
| 5,045,192 | A | 9/1991 | Terhune | |
| 5,090,873 | A * | 2/1992 | Fain | 417/228 |
| 5,095,238 | A | 3/1992 | Suzuki et al. | |
| 5,171,430 | A | 12/1992 | Beach et al. | |
| 5,205,848 | A | 4/1993 | Blanc et al. | |
| 5,207,809 | A | 5/1993 | Higashino et al. | |
| 5,229,671 | A | 7/1993 | Neidhard et al. | |
| 5,300,223 | A | 4/1994 | Wright | |
| 5,342,519 | A | 8/1994 | Friedmann et al. | |
| 5,429,101 | A | 7/1995 | Uebelhoer et al. | |
| 5,450,835 | A | 9/1995 | Wagner | |
| 5,471,966 | A | 12/1995 | Feuling | |
| 5,536,289 | A * | 7/1996 | Spies | 55/459.5 |
| 5,538,626 | A | 7/1996 | Baumann | |
| 5,548,893 | A | 8/1996 | Koelfgen | |
| 5,549,821 | A | 8/1996 | Bounnakhom et al. | |
| 5,556,542 | A | 9/1996 | Berman et al. | |
| 5,564,401 | A | 10/1996 | Dickson | |
| 5,575,511 | A | 11/1996 | Kroha et al. | |
| 5,643,448 | A | 7/1997 | Martin et al. | |
| 5,681,461 | A | 10/1997 | Gullett et al. | |
| 5,685,985 | A | 11/1997 | Brown et al. | |
| 5,702,602 | A | 12/1997 | Brown et al. | |
| 5,737,378 | A | 4/1998 | Ballas et al. | |
| 5,738,785 | A | 4/1998 | Brown et al. | |
| 5,755,842 | A | 5/1998 | Patel et al. | |
| 5,762,671 | A | 6/1998 | Farrow et al. | |
| 5,770,065 | A | 6/1998 | Popoff et al. | |
| 5,837,137 | A | 11/1998 | Janik | |
| 5,846,416 | A | 12/1998 | Gullett | |
| 5,911,213 | A * | 6/1999 | Ahlborn et al. | 123/572 |
| 6,006,924 | A | 12/1999 | Sandford | |
| 6,019,717 | A | 2/2000 | Herman | |
| 6,068,763 | A | 5/2000 | Goddard | |
| 6,123,061 | A * | 9/2000 | Baker et al. | 123/573 |
| 6,139,595 | A * | 10/2000 | Herman et al. | 55/312 |
| 6,139,738 | A | 10/2000 | Maxwell | |
| 6,146,527 | A | 11/2000 | Oelschlaegel | |
| 6,152,120 | A * | 11/2000 | Julazadeh | 123/572 |
| 6,183,407 | B1 | 2/2001 | Hallgren et al. | |
| 6,213,929 | B1 * | 4/2001 | May | 494/24 |
| 6,281,319 | B1 | 8/2001 | Mentak | |
| 6,337,213 | B1 | 1/2002 | Simon et al. | |
| 6,364,822 | B1 | 4/2002 | Herman et al. | |
| 6,506,302 | B2 | 1/2003 | Janik | |
| 6,517,612 | B1 | 2/2003 | Crouch et al. | |
| 6,527,821 | B2 | 3/2003 | Liu et al. | |
| 6,533,713 | B1 | 3/2003 | Borgstrom et al. | |
| 6,640,792 | B2 | 11/2003 | Harvey et al. | |
| 6,701,580 | B1 | 3/2004 | Bandyopadhyay | |
| 6,709,477 | B1 * | 3/2004 | Håkansson et al. | 55/401 |
| 6,752,924 | B2 | 6/2004 | Gustafson et al. | |
| 6,755,896 | B2 | 6/2004 | Szepessy et al. | |
| 6,783,571 | B2 | 8/2004 | Ekeroth | |
| 6,821,319 | B1 | 11/2004 | Moberg et al. | |
| 6,858,056 | B2 | 2/2005 | Kwan | |
| 6,893,478 | B2 | 5/2005 | Care et al. | |
| 6,925,993 | B1 * | 8/2005 | Eliasson et al. | 123/572 |
| 6,973,925 | B2 | 12/2005 | Sauter et al. | |
| 6,986,805 | B2 | 1/2006 | Gieseke et al. | |
| 7,000,894 | B2 | 2/2006 | Olson et al. | |
| 7,022,163 | B2 | 4/2006 | Olsson et al. | |
| 7,081,145 | B2 | 7/2006 | Gieseke et al. | |
| 7,081,146 | B2 | 7/2006 | Hallgren et al. | |
| 7,104,239 | B2 | 9/2006 | Kawakubo et al. | |
| 7,152,589 | B2 | 12/2006 | Ekeroth et al. | |
| 7,185,643 | B2 | 3/2007 | Gronberg et al. | |
| 7,235,177 | B2 | 6/2007 | Herman et al. | |
| 7,258,111 | B2 | 8/2007 | Shieh et al. | |
| 7,294,948 | B2 | 11/2007 | Wasson et al. | |
| 7,338,546 | B2 * | 3/2008 | Eliasson et al. | 55/406 |
| 7,377,271 | B2 | 5/2008 | Hoffmann et al. | |
| 7,396,373 | B2 | 7/2008 | Lagerstedt et al. | |
| 7,465,341 | B2 | 12/2008 | Eliasson | |
| 7,473,034 | B2 | 1/2009 | Saito et al. | |
| 7,569,094 | B2 | 8/2009 | Kane et al. | |
| 7,597,809 | B1 | 10/2009 | Roberts | |
| 7,614,390 | B2 | 11/2009 | Holzmann et al. | |
| 7,723,887 | B2 | 5/2010 | Yang et al. | |
| 7,824,458 | B2 | 11/2010 | Borgstrom et al. | |

(56) References Cited

U.S. PATENT DOCUMENTS

| | | |
|---|---|---|
| 7,824,459 B2 | 11/2010 | Borgstrom et al. |
| 7,842,459 B2 | 11/2010 | Ayalon-Soffer et al. |
| 8,177,875 B2 | 5/2012 | Rogers et al. |
| 8,404,014 B2 | 3/2013 | Israel et al. |
| 8,499,750 B2 | 8/2013 | Koyamaishi et al. |
| 8,794,222 B2 * | 8/2014 | Schwandt et al. ............ 123/573 |
| 8,807,097 B2 * | 8/2014 | Schwandt et al. ......... 123/41.86 |
| 8,893,689 B2 * | 11/2014 | Dawar et al. ................. 123/573 |
| 8,940,068 B2 | 1/2015 | Smith et al. |
| 9,194,265 B2 | 11/2015 | Parikh et al. |
| 2001/0012814 A1 | 8/2001 | May et al. |
| 2003/0024870 A1 | 2/2003 | Reinhart |
| 2003/0034016 A1 | 2/2003 | Harvey et al. |
| 2003/0233939 A1 | 12/2003 | Szepessy et al. |
| 2004/0168415 A1 * | 9/2004 | Hilpert ................... B01D 45/16 |
| | | 55/406 |
| 2004/0206083 A1 * | 10/2004 | Okuyama et al. ............. 60/608 |
| 2004/0214710 A1 | 10/2004 | Herman et al. |
| 2004/0226442 A1 | 11/2004 | Olsson et al. |
| 2005/0060970 A1 | 3/2005 | Polderman |
| 2005/0120685 A1 | 6/2005 | Fischer et al. |
| 2005/0178718 A1 | 8/2005 | Geibel et al. |
| 2005/0198932 A1 | 9/2005 | Franzen et al. |
| 2005/0223687 A1 | 10/2005 | Miller et al. |
| 2006/0048761 A1 * | 3/2006 | Ekeroth et al. ............... 123/572 |
| 2006/0090430 A1 | 5/2006 | Trautman et al. |
| 2006/0090738 A1 * | 5/2006 | Hoffmann et al. ........... 123/573 |
| 2006/0145555 A1 | 7/2006 | Petro et al. |
| 2006/0162305 A1 | 7/2006 | Reid |
| 2007/0062887 A1 | 3/2007 | Schwandt et al. |
| 2007/0084194 A1 * | 4/2007 | Holm .............................. 60/283 |
| 2007/0107703 A1 * | 5/2007 | Natkin ......................... 123/527 |
| 2007/0163215 A1 | 7/2007 | Lagerstadt |
| 2007/0289632 A1 | 12/2007 | Della Casa |
| 2008/0009402 A1 * | 1/2008 | Kane et al. ..................... 494/53 |
| 2008/0250772 A1 | 10/2008 | Becker et al. |
| 2008/0264251 A1 | 10/2008 | Szepessy |
| 2008/0290018 A1 | 11/2008 | Carew |
| 2008/0307965 A1 | 12/2008 | Hoffman et al. |
| 2009/0000258 A1 | 1/2009 | Carlsson et al. |
| 2009/0013658 A1 | 1/2009 | Borgstrom et al. |
| 2009/0025562 A1 | 1/2009 | Hallgren et al. |
| 2009/0025662 A1 | 1/2009 | Herman et al. |
| 2009/0050121 A1 | 2/2009 | Holzmann et al. |
| 2009/0126324 A1 | 5/2009 | Smith et al. |
| 2009/0178964 A1 | 7/2009 | Cline et al. |
| 2009/0186752 A1 | 7/2009 | Isaksson et al. |
| 2009/0223496 A1 | 9/2009 | Borgstrom et al. |
| 2009/0249756 A1 | 10/2009 | Schrage et al. |
| 2009/0266235 A1 * | 10/2009 | Kane et al. ......................... 96/1 |
| 2009/0266325 A1 | 10/2009 | Kumar et al. |
| 2009/0272085 A1 | 11/2009 | Gieseke et al. |
| 2010/0011723 A1 | 1/2010 | Szepessy et al. |
| 2010/0043734 A1 | 2/2010 | Holzmann et al. |
| 2010/0180854 A1 | 7/2010 | Baumann et al. |
| 2010/0229537 A1 | 9/2010 | Holm |
| 2011/0005160 A1 | 1/2011 | Nihei |
| 2011/0017155 A1 | 1/2011 | Jacob |
| 2011/0056455 A1 | 3/2011 | Koyamaishi et al. |
| 2011/0180051 A1 | 7/2011 | Schwandt et al. |
| 2011/0180052 A1 | 7/2011 | Schwandt et al. |
| 2011/0247309 A1 | 10/2011 | Smith et al. |
| 2011/0252974 A1 | 10/2011 | Verdegan et al. |
| 2011/0281712 A1 | 11/2011 | Schlamann et al. |

FOREIGN PATENT DOCUMENTS

| | | |
|---|---|---|
| CN | 2809233 | 8/2006 |
| CN | 1961139 | 5/2007 |
| CN | 1961139 A | 5/2007 |
| CN | 101189414 | 5/2008 |
| CN | 101549331 | 10/2009 |
| DE | 20302824 U1 | 8/2014 |
| EP | 0 844 012 | 5/1998 |
| EP | 0 880 987 | 12/1998 |
| FR | 2378555 | 8/1978 |
| FR | 2933626 | 1/2010 |
| WO | WO-2009/005355 | 1/2009 |
| WO | WO-2009/138872 A1 | 11/2009 |
| WO | WO-2010/051994 | 5/2010 |
| WO | WO-2011/005160 | 1/2011 |

OTHER PUBLICATIONS

Haldex, Alfdex Oil Mist Separator, www.haldex.com, Stockhol, Sweden, Sep. 2004, 6 pgs.
Haldex, Alfdex Oil Mist Separator, www.haldex.com, Stockholm, Sweden, Sep. 2004, 6 pgs.
First Office Action issued in Chinese Patent Application No. 2012800541656, dated Feb. 6, 2015 and translation, 19 pages.
Second Office Action Issued for Chinese Patent Application No. 201180004421.6 issued Jul. 11, 2014, and translation, 48 pages.
Third Office Action issued for Chinese Patent Application No. 201180004421.6 issued Feb. 10, 2015, and translation, 17 pages.
First Office Action issued for Chinese Patent Application No. 201180004421.6 issued Jan. 30, 2014, and translation 43 pages.
U.S. Office Action for U.S. Appl. No. 14/880,003, issued Mar. 17, 2016, 13 pages.
Extended European Search Report issued for European Patent Application No. 11737444.7, issued Sep. 30, 2016, 6 pages.
Notice of Allowance Issued for U.S. Appl. No. 14/880,003, issued Sep. 30, 2016, 47 pages.

* cited by examiner

CRANKCASE VENTILATION SELF-CLEANING COALESCER WITH INTERMITTENT ROTATION

CROSS-REFERENCE TO RELATED APPLICATIONS

The present application is a continuation of U.S. patent application Ser. No. 13/752,535, filed on Jan. 29, 2013, which is a continuation-in-part of U.S. patent application Ser. No. 12/969,742, filed Dec. 16, 2010, now U.S. Pat. No. 8,794,222, and a continuation-in-part of U.S. patent application Ser. No. 12/969,755, filed Dec. 16, 2010, now U.S. Pat. No. 8,807,097, which claim the benefit of priority from U.S. Provisional Patent Application No. 61/383,787, filed Sep. 17, 2010, U.S. Provisional Patent Application No. 61/383,793, filed Sep. 17, 2010, U.S. Provisional Patent Application No. 61/383,790, filed Sep. 17, 2010, U.S. Provisional Patent Application No. 61/359,192, filed Jun. 28, 2010, U.S. Provisional Patent Application No. 61/298,630, filed Jan. 27, 2010, and U.S. Provisional Patent Application No. 61/298,635, filed Jan. 27, 2010, which are all hereby incorporated in their entirety by reference.

BACKGROUND AND SUMMARY

The invention relates to internal combustion engine crankcase ventilation separators, particularly coalescers.

Internal combustion engine crankcase ventilation separators are known in the prior art. One type of separator uses inertial impaction air-oil separation for removing oil particles from the crankcase blowby gas or aerosol by accelerating the blowby gas stream to high velocities through nozzles or orifices and directing same against an impactor, causing a sharp directional change effecting the oil separation. Another type of separator uses coalescence in a coalescing filter for removing oil droplets.

The present invention arose during continuing development efforts in the latter noted air-oil separation technology, namely removal of oil from the crankcase blowby gas stream by coalescence using a coalescing filter.

DETAILED DESCRIPTION

Figure 1:
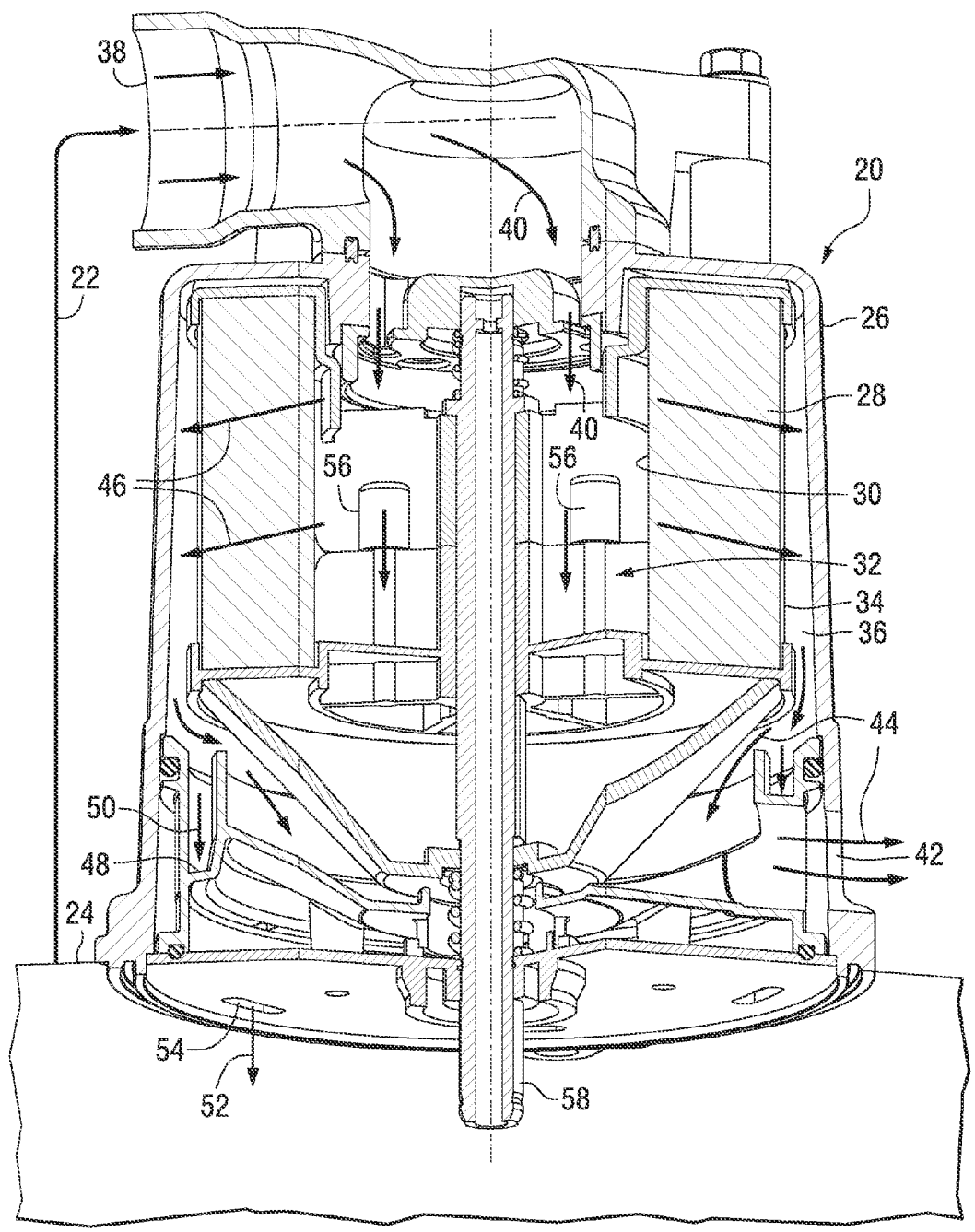
FIG. 1 is a sectional view of a coalescing filter assembly.

FIG. 1 shows an internal combustion engine crankcase ventilation rotating coalescer 20 separating air from oil in blowby gas 22 from engine crankcase 24. A coalescing filter assembly 26 includes an annular rotating coalescing filter element 28 having an inner periphery 30 defining a hollow interior 32, and an outer periphery 34 defining an exterior 36. And inlet port 38 supplies blowby gas 22 from crankcase 24 to hollow interior 32 as shown at arrows 40. An outlet port 42 delivers cleaned separated air from the noted exterior zone 36 as shown at arrows 44. The direction of blowby gas flow is inside-out, namely radially outwardly from hollow interior 32 to exterior 36 as shown at arrows 46. Oil in the blowby gas is forced radially outwardly from inner periphery 30 by centrifugal force, to reduce clogging of the coalescing filter element 28 otherwise caused by oil sitting on inner periphery 30. This also opens more area of the coalescing filter element to flow-through, whereby to reduce restriction and pressure drop. Centrifugal force drives oil radially outwardly from inner periphery 30 to outer periphery 34 to clear a greater volume of coalescing filter element 28 open to flow-through, to increase coalescing capacity. Separated oil drains from outer periphery 34. Drain port 48 communicates with exterior 36 and drains separated oil from outer periphery 34 as shown at arrow 50, which oil may then be returned to the engine crankcase as shown at arrow 52 from drain 54.

Centrifugal force pumps blowby gas from the crankcase to hollow interior 32. The pumping of blowby gas from the crankcase to hollow interior 32 increases with increasing speed of rotation of coalescing filter element 28. The increased pumping of blowby gas 22 from crankcase 24 to hollow interior 32 reduces restriction across coalescing filter element 28. In one embodiment, a set of vanes may be provided in hollow interior 32 as shown in dashed line at 56, enhancing the noted pumping. The noted centrifugal force creates a reduced pressure zone in hollow interior 32, which reduced pressure zone sucks blowby gas 22 from crankcase 24.

Figure 2:
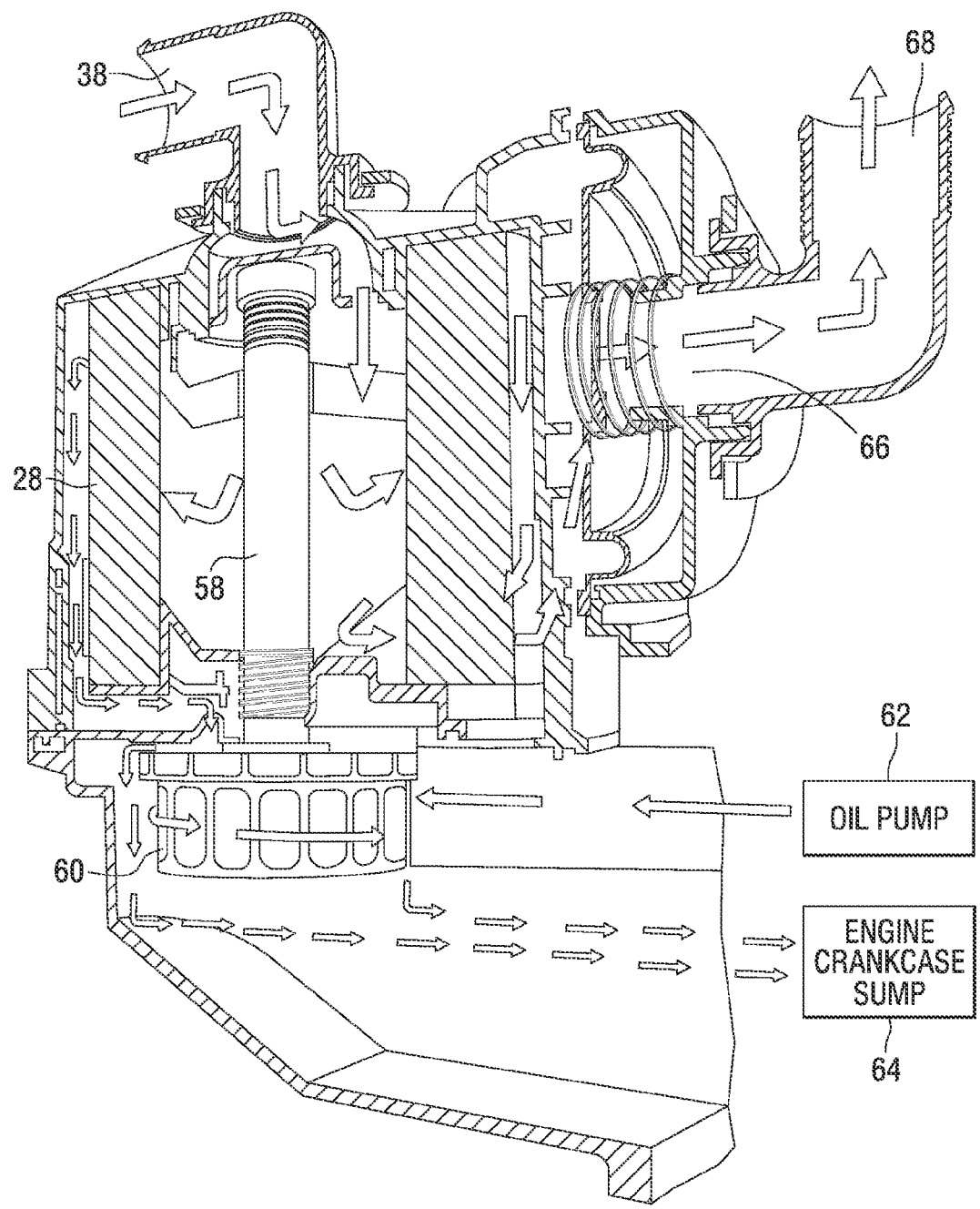
FIG. 2 is a sectional view of another coalescing filter assembly.
Figure 3:
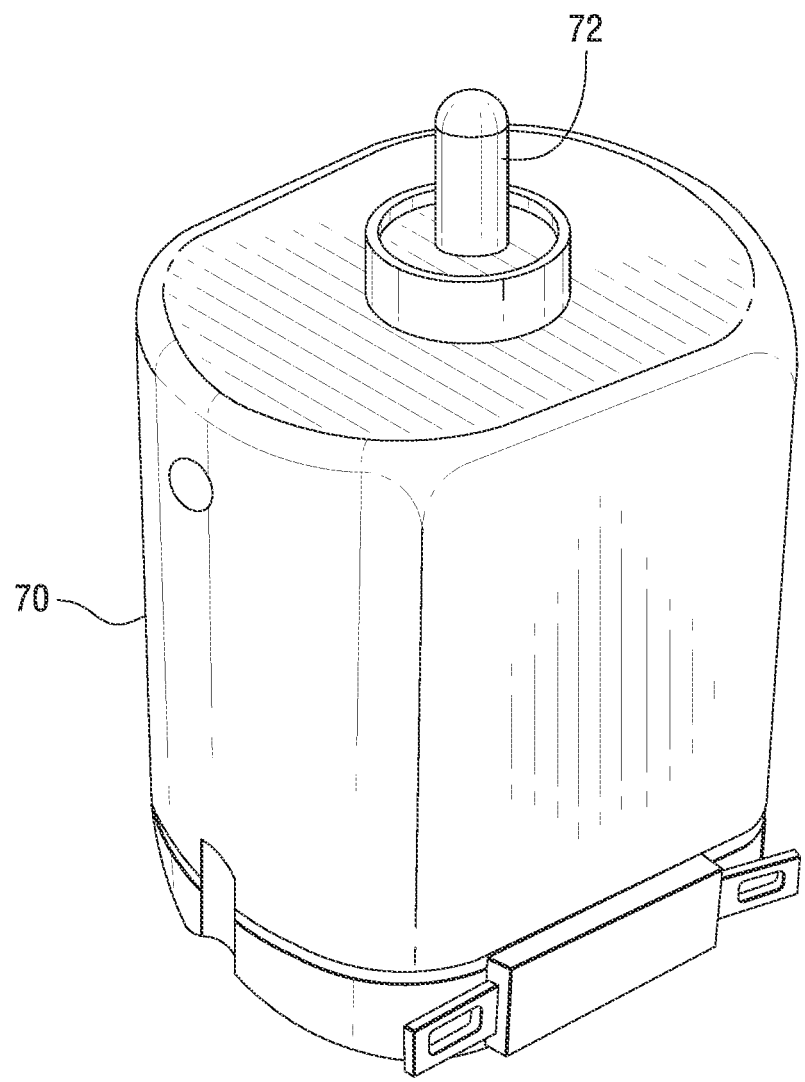
FIG. 3 is like FIG. 2 and shows another embodiment.
Figure 4:
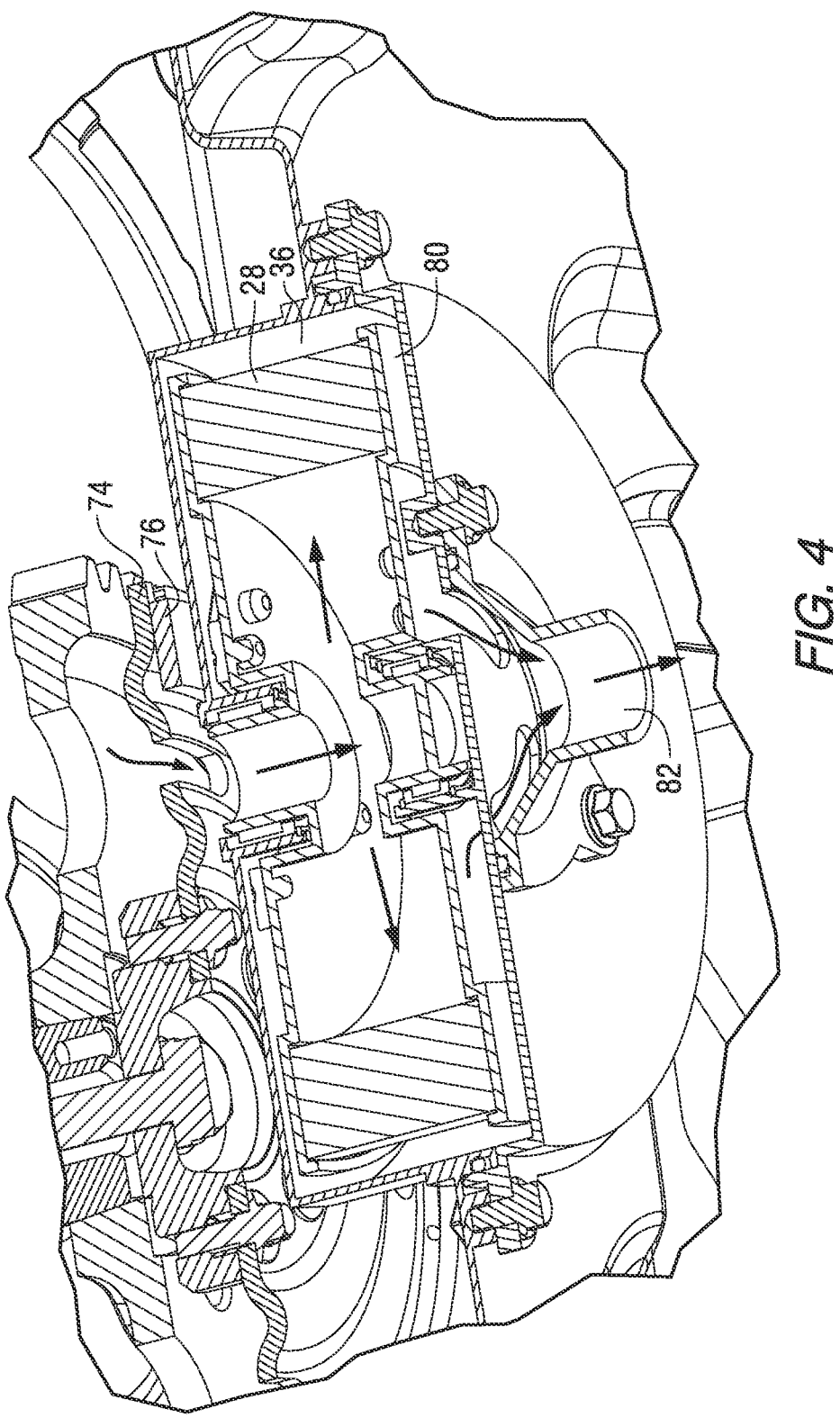
FIG. 4 is a sectional view of another coalescing filter assembly.
Figure 5:
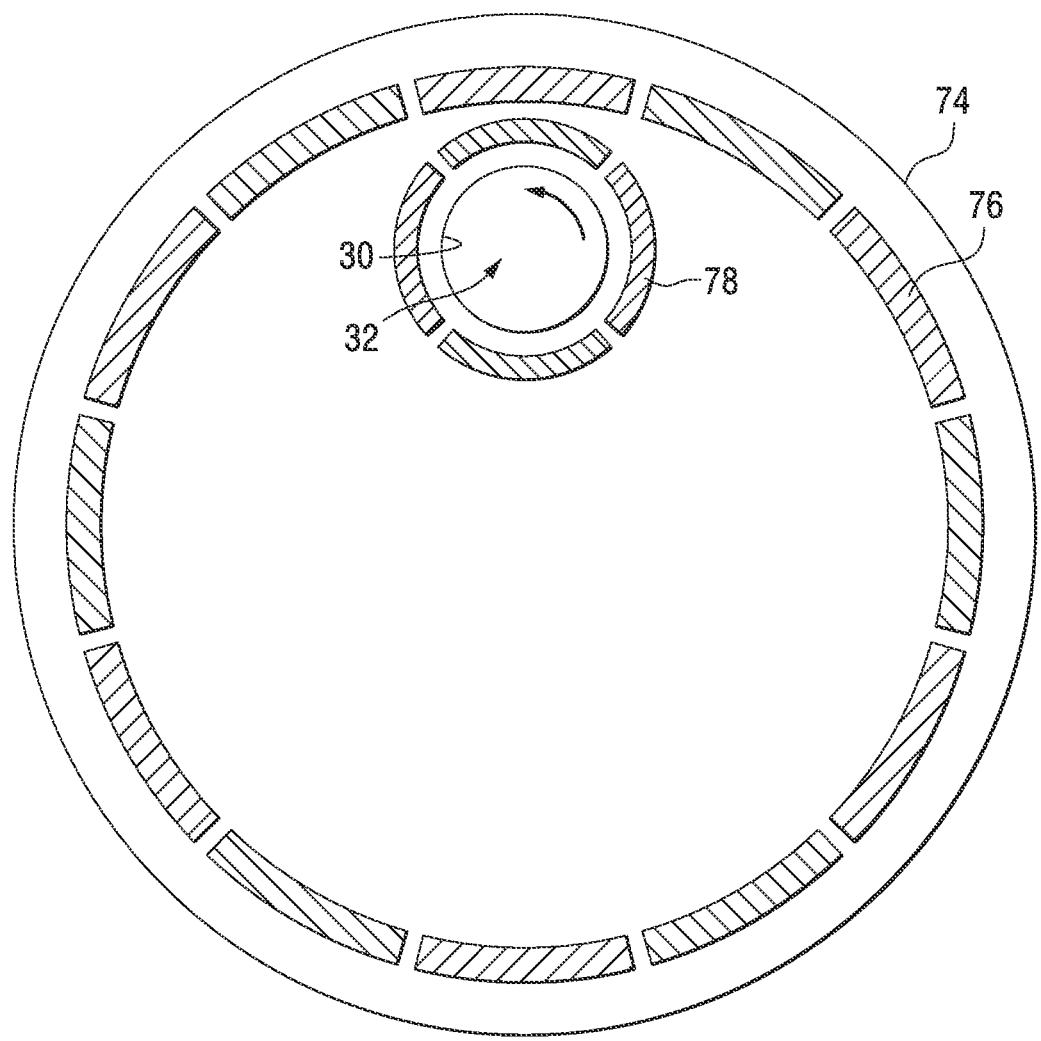
FIG. 5 is a schematic view illustrating operation of the assembly of FIG. 4.

In one embodiment, coalescing filter element 28 is driven to rotate by a mechanical coupling to a component of the engine, e.g. axially extending shaft 58 connected to a gear or drive pulley of the engine. In another embodiment, coalescing filter element 28 is driven to rotate by a fluid motor, e.g. a pelton or turbine drive wheel 60, FIG. 2, driven by pumped pressurized oil from the engine oil pump 62 and returning same to engine crankcase sump 64. FIG. 2 uses like reference numerals from FIG. 1 where appropriate to facilitate understanding. Separated cleaned air is supplied through pressure responsive valve 66 to outlet 68 which is an alternate outlet to that shown at 42 in FIG. 1. In another embodiment, coalescing filter element 28 is driven to rotate by an electric motor 70, FIG. 3, having a drive output rotary shaft 72 coupled to shaft 58. In another embodiment, coalescing filter element 28 is driven to rotate by magnetic coupling to a component of the engine, FIGS. 4, 5. An engine driven rotating gear 74 has a plurality of magnets such as 76 spaced around the periphery thereof and magnetically coupling to a plurality of magnets 78 spaced around inner periphery 30 of the coalescing filter element such that as gear or driving wheel 74 rotates, magnets 76 move past, FIG. 5, and magnetically couple with magnets 78, to in turn rotate the coalescing filter element as a driven member. In FIG. 4, separated cleaned air flows from exterior zone 36 through channel 80 to outlet 82, which is an alternate cleaned air outlet to that shown at 42 in FIG. 1. The arrangement in FIG. 5 provides a gearing-up effect to rotate the coalescing filter assembly at a greater rotational speed (higher angular velocity) than driving gear or wheel 74, e.g. where it is desired to provide a higher rotational speed of the coalescing filter element.

Pressure drop across coalescing filter element 28 decreases with increasing rotational speed of the coalescing filter element. Oil saturation of coalescing filter element 28 decreases with increasing rotational speed of the coalescing filter element. Oil drains from outer periphery 34, and the amount of oil drained increases with increasing rotational speed of coalescing filter element 28. Oil particle settling velocity in coalescing filter element 28 acts in the same direction as the direction of air flow through the coalescing filter element. The noted same direction enhances capture and coalescence of oil particles by the coalescing filter element.

The system provides a method for separating air from oil in internal combustion engine crankcase ventilation blowby gas by introducing a G force in coalescing filter element 28 to cause increased gravitational settling in the coalescing filter element, to improve particle capture and coalescence of submicron oil particles by the coalescing filter element. The method includes providing an annular coalescing filter element 28, rotating the coalescing filter element, and providing inside-out flow through the rotating coalescing filter element.

The system provides a method for reducing crankcase pressure in an internal combustion engine crankcase generating blowby gas. The method includes providing a crankcase ventilation system including a coalescing filter element 28 separating air from oil in the blowby gas, providing the coalescing filter element as an annular element having a hollow interior 32, supplying the blowby gas to the hollow interior, and rotating the coalescing filter element to pump blowby gas out of crankcase 24 and into hollow interior 32 due to centrifugal force forcing the blowby gas to flow radially outwardly as shown at arrows 46 through coalescing filter element 28, which pumping effects reduced pressure in crankcase 24.

One type of internal combustion engine crankcase ventilation system provides open crankcase ventilation (OCV), wherein the cleaned air separated from the blowby gas is discharged to the atmosphere. Another type of internal combustion crankcase ventilation system involves closed crankcase ventilation (CCV), wherein the cleaned air separated from the blowby gas is returned to the engine, e.g. is returned to the combustion air intake system to be mixed with the incoming combustion air supplied to the engine.

Figure 6:
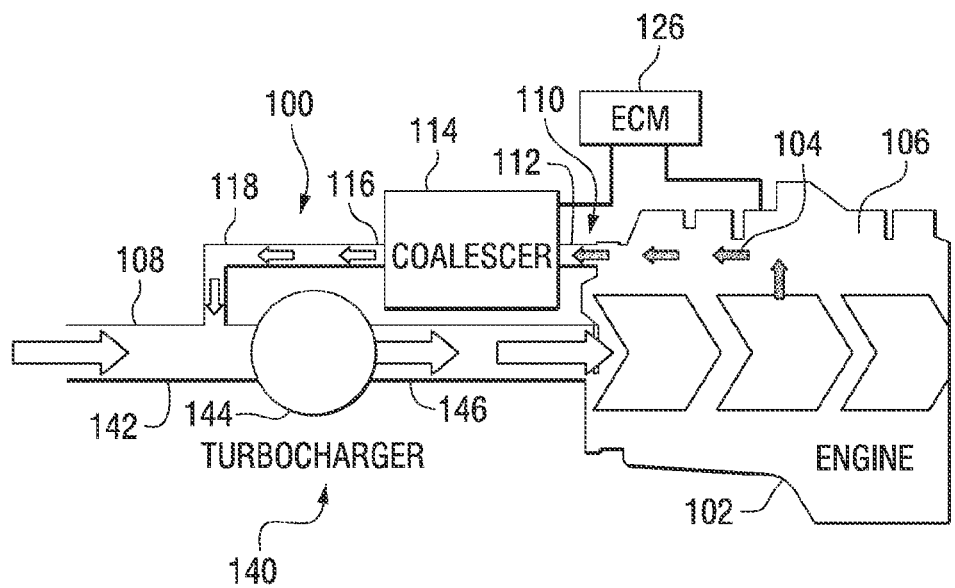
FIG. 6 is a schematic system diagram illustrating an engine intake system.

FIG. 6 shows a closed crankcase ventilation (CCV) system 100 for an internal combustion engine 102 generating blowby gas 104 in a crankcase 106. The system includes an air intake duct 108 supplying combustion air to the engine, and a return duct 110 having a first segment 112 supplying the blowby gas from the crankcase to air-oil coalescer 114 to clean the blowby gas by coalescing oil therefrom and outputting cleaned air at output 116, which may be outlet 42 of FIG. 1, 68 of FIG. 2, 82 of FIG. 4. Return duct 110 includes a second segment 118 supplying the cleaned air from coalescer 114 to air intake duct 108 to join the combustion air being supplied to the engine. Coalescer 114 is variably controlled according to a given condition of the engine, to be described.

Figure 7:
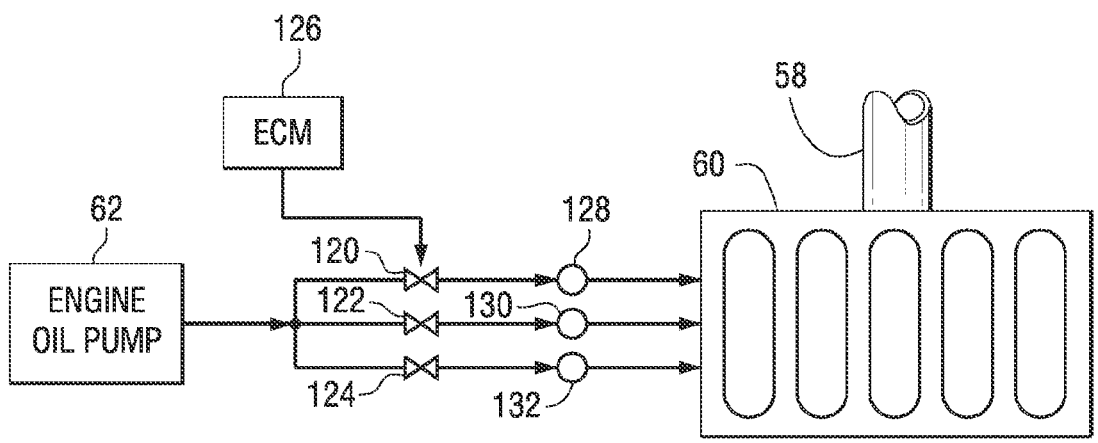
FIG. 7 is a schematic diagram illustrating a control option for the system of FIG. 6.

Coalescer 114 has a variable efficiency variably controlled according to a given condition of the engine. In one embodiment, coalescer 114 is a rotating coalescer, as above, and the speed of rotation of the coalescer is varied according to the given condition of the engine. In one embodiment, the given condition is engine speed. In one embodiment, the coalescer is driven to rotate by an electric motor, e.g. 70, FIG. 3. In one embodiment, the electric motor is a variable speed electric motor to vary the speed of rotation of the coalescer. In another embodiment, the coalescer is hydraulically driven to rotate, e.g. FIG. 2. In one embodiment, the speed of rotation of the coalescer is hydraulically varied. In this embodiment, the engine oil pump 62, FIGS. 2, 7, supplies pressurized oil through a plurality of parallel shut-off valves such as 120, 122, 124 which are controlled between closed and open or partially open states by the electronic control module (ECM) 126 of the engine, for flow through respective parallel orifices or nozzles 128, 130, 132 to controllably increase or decrease the amount of pressurized oil supplied against pelton or turbine wheel 60, to in turn controllably vary the speed of rotation of shaft 58 and coalescing filter element 28.

In one embodiment, a turbocharger system 140, FIG. 6, is provided for the internal combustion 102 generating blowby gas 104 in crankcase 106. The system includes the noted air intake duct 108 having a first segment 142 supplying combustion air to a turbocharger 144, and a second segment 146 supplying turbocharged combustion air from turbocharger 144 to engine 102. Return duct 110 has the noted first segment 112 supplying the blowby gas 104 from crankcase 106 to air-oil coalescer 114 to clean the blowby gas by coalescing oil therefrom and outputting cleaned air at 116. The return duct has the noted second segment 118 supplying cleaned air from coalescer 114 to first segment 142 of air intake duct 108 to join combustion air supplied to turbocharger 144. Coalescer 114 is variably controlled according to a given condition of at least one of turbocharger 144 and engine 102. In one embodiment, the given condition is a condition of the turbocharger. In a further embodiment, the coalescer is a rotating coalescer, as above, and the speed of rotation of the coalescer is varied according to turbocharger efficiency. In a further embodiment, the speed of rotation of the coalescer is varied according to turbocharger boost pressure. In a further embodiment, the speed of rotation of the coalescer is varied according to turbocharger boost ratio, which is the ratio of pressure at the turbocharger outlet versus pressure at the turbocharger inlet. In a further embodiment, the coalescer is driven to rotate by an electric motor, e.g. 70, FIG. 3. In a further embodiment, the electric motor is a variable speed electric motor to vary the speed of rotation of the coalescer. In another embodiment, the coalescer is hydraulically driven to rotate, FIG. 2. In a further embodiment, the speed of rotation of the coalescer is hydraulically varied, FIG. 7.

The system provides a method for improving turbocharger efficiency in a turbocharger system 140 for an internal combustion engine 102 generating blowby gas 104 in a crankcase 106, the system having an air intake duct 108 having a first segment 142 supplying combustion air to a turbocharger 144, and a second segment 146 supplying turbocharged combustion air from the turbocharger 144 to the engine 102, and having a return duct 110 having a first segment 112 supplying the blowby gas 104 to air-oil coalescer 114 to clean the blowby gas by coalescing oil therefrom and outputting cleaned air at 116, the return duct having a second segment 118 supplying the cleaned air from the coalescer 114 to the first segment 142 of the air intake duct to join combustion air supplied to turbocharger 144. The method includes variably controlling coalescer 114 according to a given condition of at least one of turbocharger 144 and engine 102. One embodiment variably controls coalescer 114 according to a given condition of turbocharger 144. A further embodiment provides the coalescer as a rotating coalescer, as above, and varies the speed of rotation of the coalescer according to turbocharger efficiency. A further method varies the speed of rotation of coalescer 114 according to turbocharger boost pressure. A further embodiment varies the speed of rotation of coalescer 114 according to turbocharger boost ratio, which is the ratio of pressure at the turbocharger outlet versus pressure at the turbocharger inlet.

Figure 8:
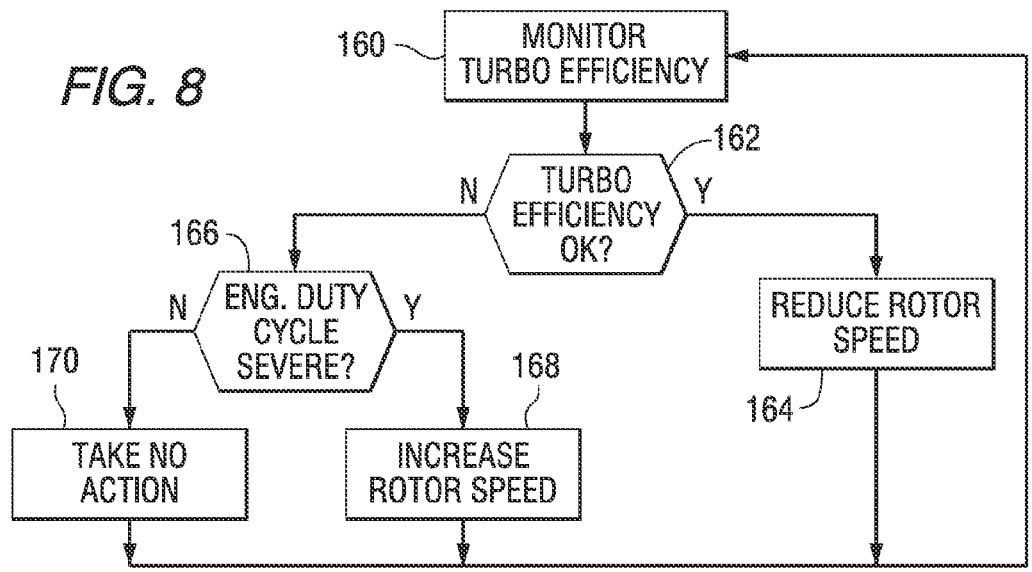
FIG. 8 is a flow diagram illustrating an operational control for the system of FIG. 6.

FIG. 8 shows a control scheme for CCV implementation. At step 160, turbocharger efficiency is monitored, and if the turbo efficiency is ok as determined at step 162, then rotor speed of the coalescing filter element is reduced at step 164. If the turbocharger efficiency is not ok, then engine duty cycle is checked at step 166, and if the engine duty cycle is severe then rotor speed is increased at step 168, and if engine duty cycle is not severe then no action is taken at step 170.

Figure 9:
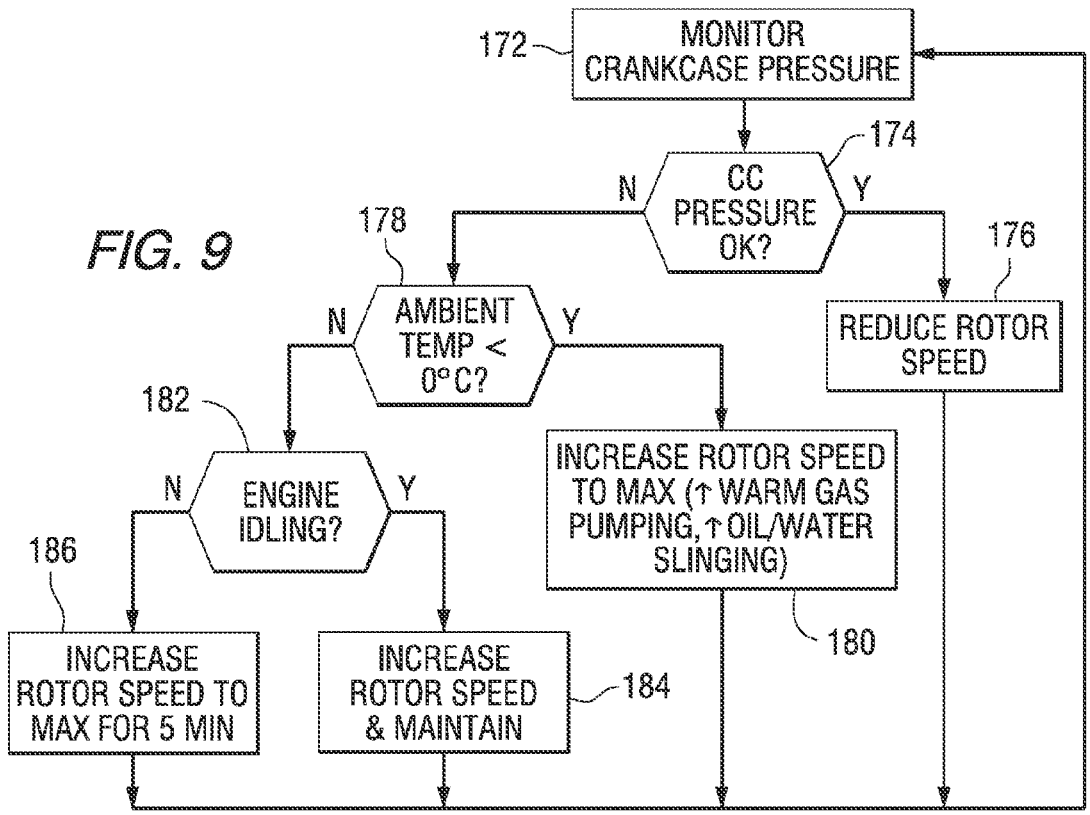
FIG. 9 is like FIG. 8 and shows another embodiment.

FIG. 9 shows a control scheme for OCV implementation. Crankcase pressure is monitored at step 172, and if it is ok as determined at step 174 then rotor speed is reduced at step 176, and if not ok then ambient temperature is checked at step 178 and if less than 0° C., then at step 180 rotor speed is increased to a maximum to increase warm gas pumping and increase oil-water slinging. If ambient temperature is not less than 0° C., then engine idling is checked at step 182, and if the engine is idling then at step 184 rotor speed is increased and maintained, and if the engine is not idling, then at step 186 rotor speed is increased to a maximum for five minutes.

Figure 10:
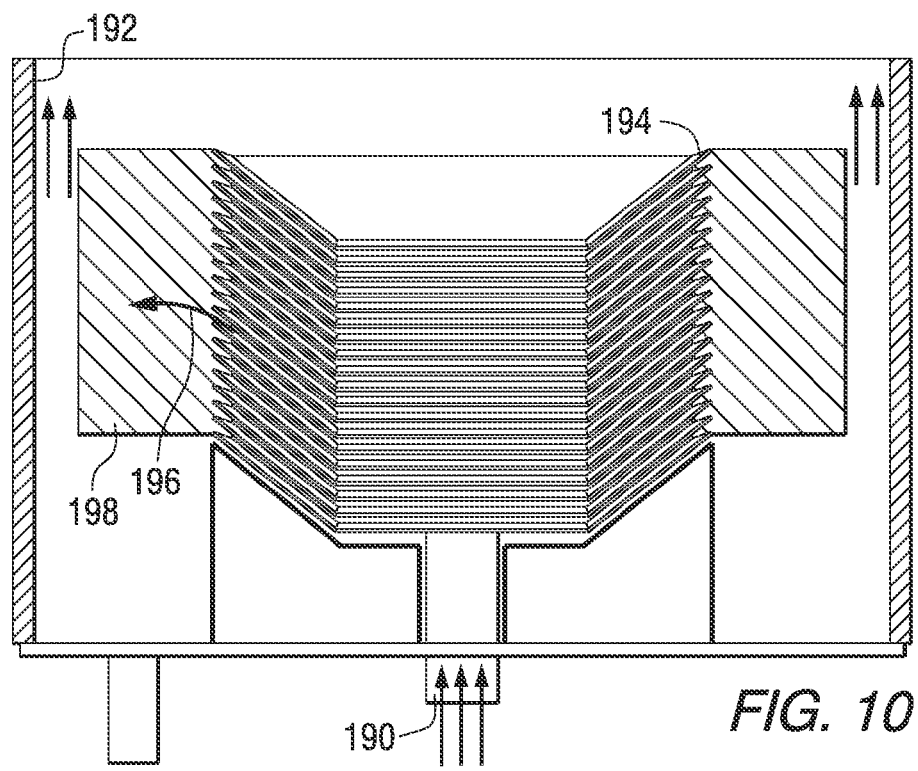
FIG. 10 is a schematic sectional view show a coalescing filter assembly.
Figure 11:
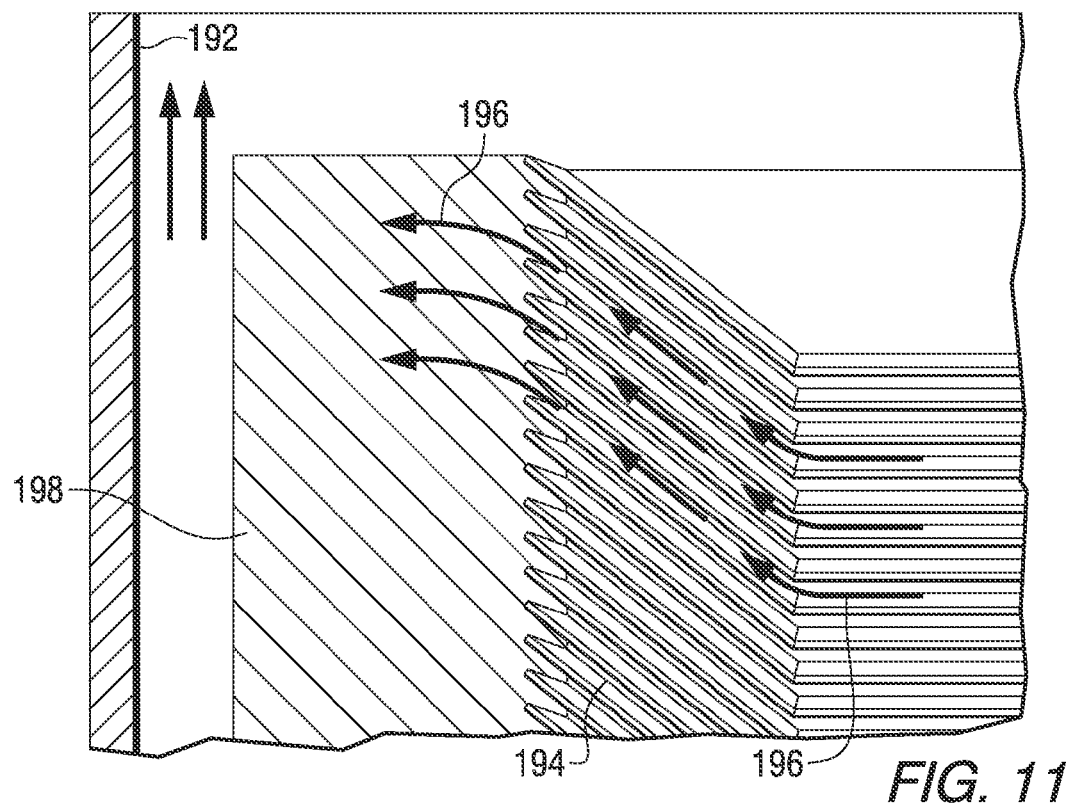
FIG. 11 is an enlarged view of a portion of FIG. 10.
Figure 12:
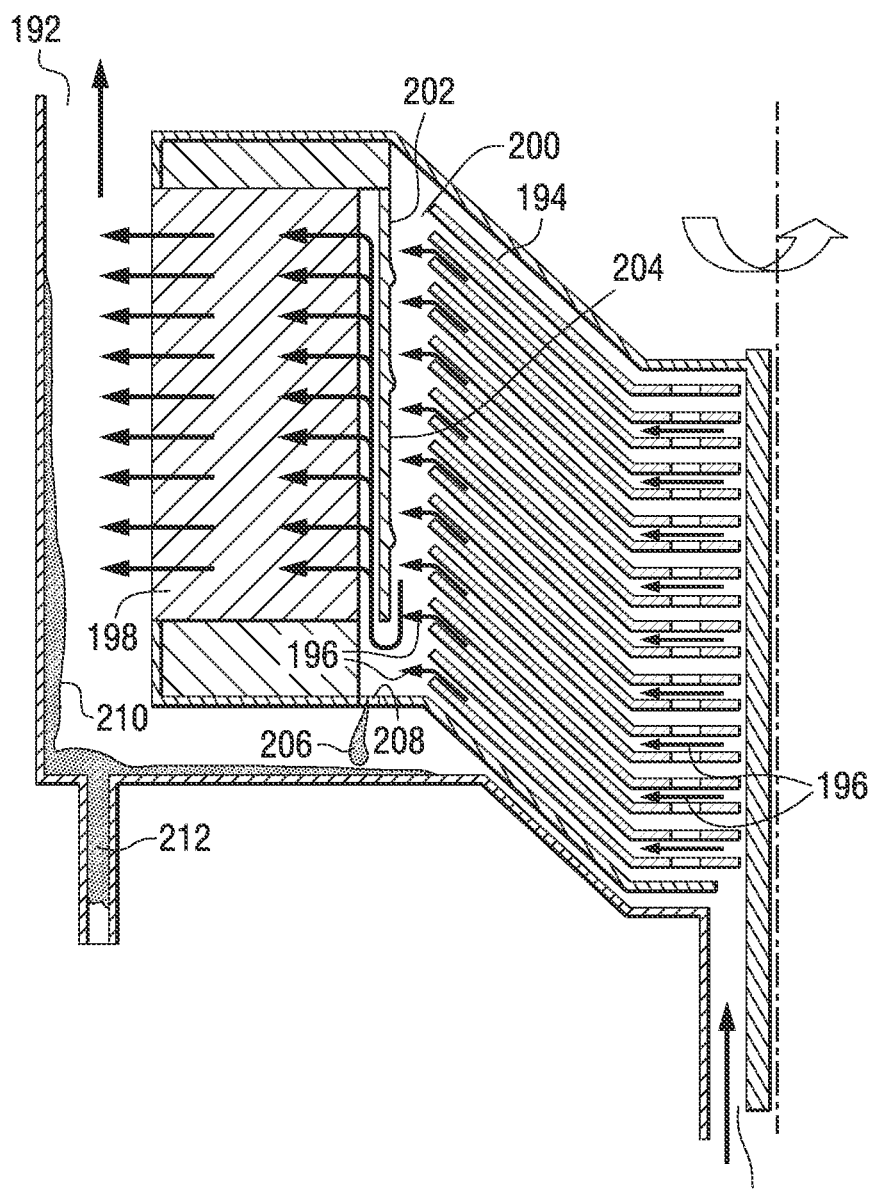
FIG. 12 is a schematic sectional view of a coalescing filter assembly.

The flow path through the coalescing filter assembly is from upstream to downstream, e.g. in FIG. 1 from inlet port 38 to outlet port 42, e.g. in FIG. 2 from inlet port 38 to outlet port 68, e.g. in FIG. 10 from inlet port 190 to outlet port 192. There is further provided in FIG. 10 in combination a rotary cone stack separator 194 located in the flow path and separating air from oil in the blowby gas. Cone stack separators are known in the prior art. The direction of blowby gas flow through the rotating cone stack separator is inside-out, as shown at arrows 196, FIGS. 10-12. Rotating cone stack separator 194 is upstream of rotating coalescer filter element 198. Rotating cone stack separator 194 is in hollow interior 200 of rotating coalescer filter element 198. In FIG. 12, an annular shroud 202 is provided in hollow interior 200 and is located radially between rotating cone stack separator 194 and rotating coalescer filter element 198 such that shroud 202 is downstream of rotating cone stack separator 194 and upstream of rotating coalescer filter element 198 and such that shroud 202 provides a collection and drain surface 204 along which separated oil drains after separation by the rotating cone stack separator, which oil drains as shown at droplet 206 through drain hole 208, which oil then joins the oil separated by coalescer 198 as shown at 210 and drains through main drain 212.

Figure 13:
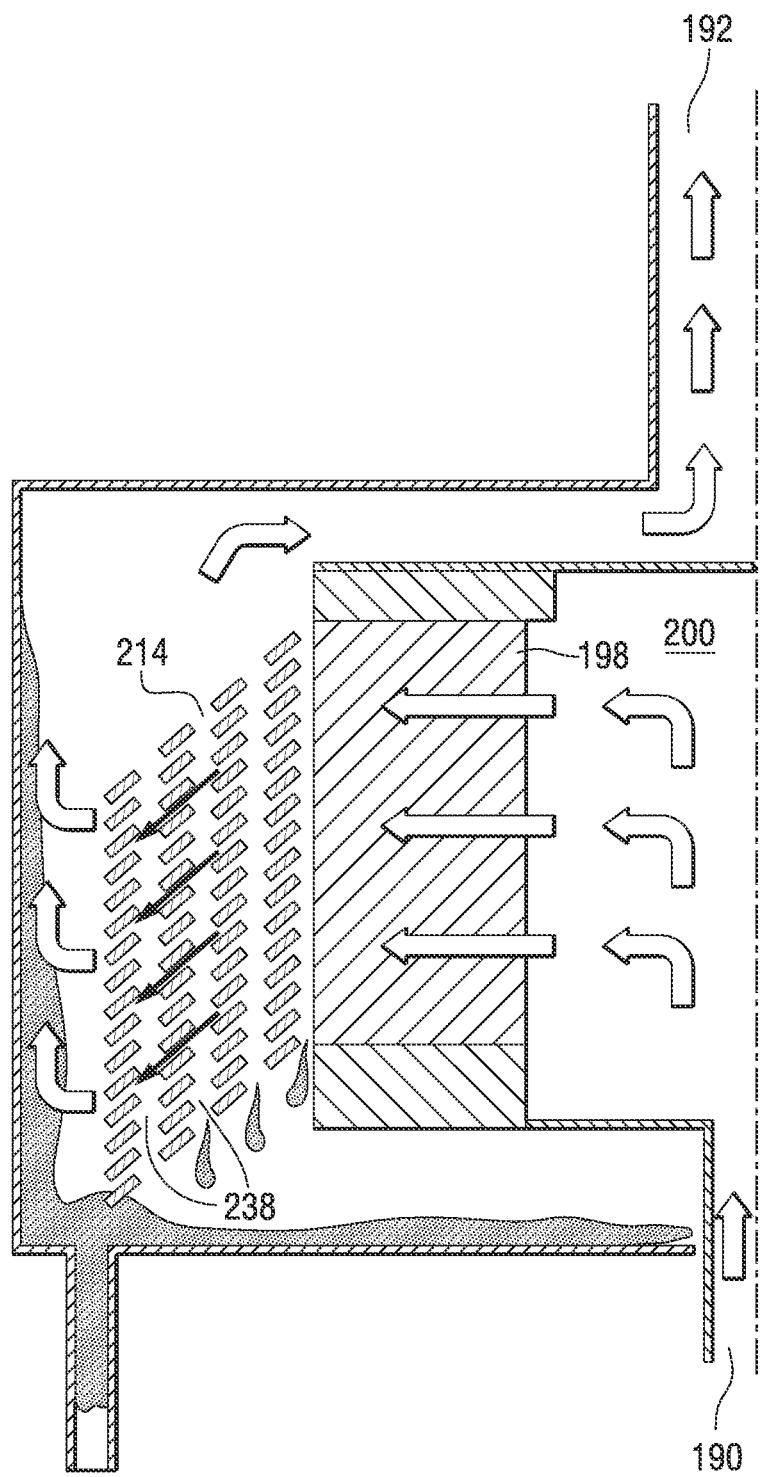
FIG. 13 is a schematic sectional view of a coalescing filter assembly.

FIG. 13 shows a further embodiment and uses like reference numerals from above where appropriate to facilitate understanding. Rotating cone stack separator 214 is downstream of rotating coalescer filter element 198. The direction of flow through rotating cone stack separator 214 is inside-out. Rotating cone stack separator 214 is located radially outwardly of and circumscribes rotating coalescer filter element 198.

Figure 14:
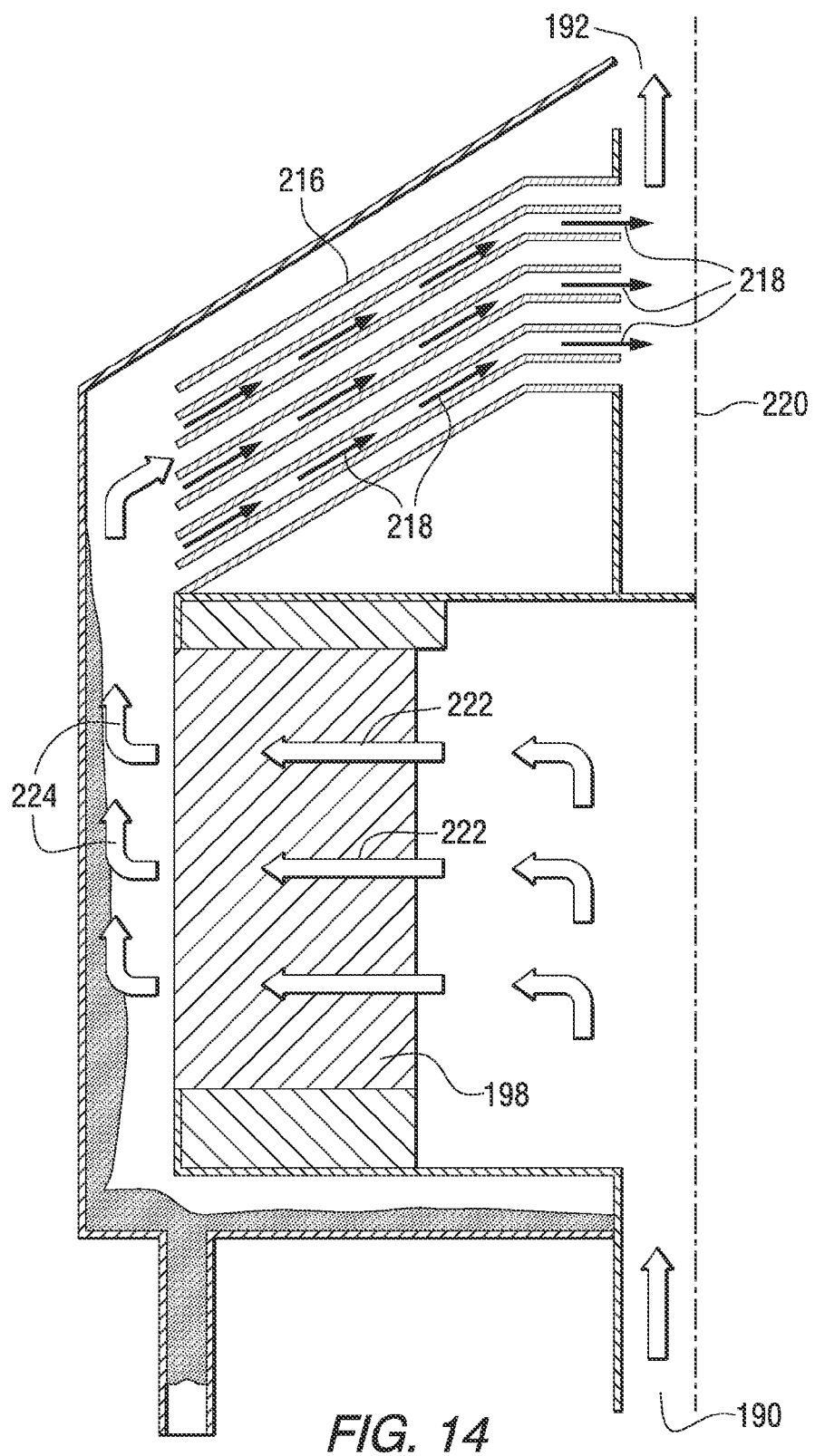
FIG. 14 is a schematic sectional view of a coalescing filter assembly.

FIG. 14 shows another embodiment and uses like reference numerals from above where appropriate to facilitate understanding. Rotating cone stack separator 216 is downstream of rotating coalescer filter element 198. The direction of flow through rotating cone stack separator 216 is outside-in, as shown at arrows 218. Rotating coalescer filter element 198 and rotating cone stack separator 216 rotate about a common axis 220 and are axially adjacent each other. Blowby gas flows radially outwardly through rotating coalescer filter element 198 as shown at arrows 222 then axially as shown at arrows 224 to rotating cone stack separator 216 then radially inwardly as shown at arrows 218 through rotating cone stack separator 216.

Figure 15:
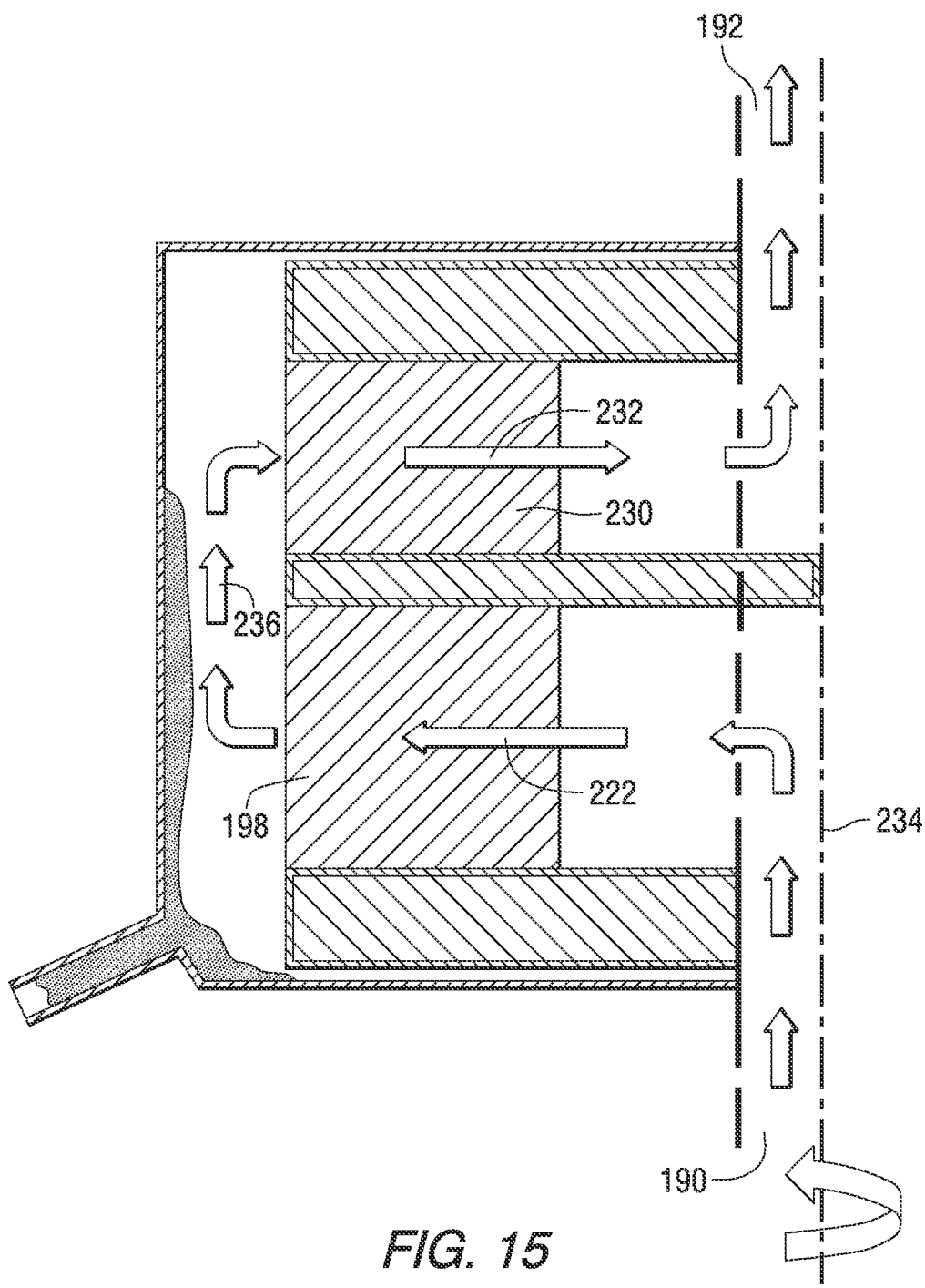
FIG. 15 is a schematic sectional view of a coalescing filter assembly.

FIG. 15 shows another embodiment and uses like reference numerals from above where appropriate to facilitate understanding. A second annular rotating coalescer filter element 230 is provided in the noted flow path from inlet 190 to outlet 192 and separates air from oil in the blowby gas. The direction of flow through second rotating coalescer filter element 230 is outside-in as shown at arrow 232. Second rotating coalescer filter element 230 is downstream of first rotating coalescer element 198. First and second rotating coalescer filter elements 198 and 230 rotate about a common axis 234 and are axially adjacent each other. Blowby gas flows radially outwardly as shown at arrow 222 through first rotating coalescer filter element 198 then axially as shown at arrow 236 to second rotating coalescer filter element 230 then radially inwardly as shown at arrow 232 through second rotating coalescer filter element 230.

In various embodiments, the rotating cone stack separator may be perforated with a plurality of drain holes, e.g. 238, FIG. 13, allowing drainage therethrough of separated oil.

Figure 16:
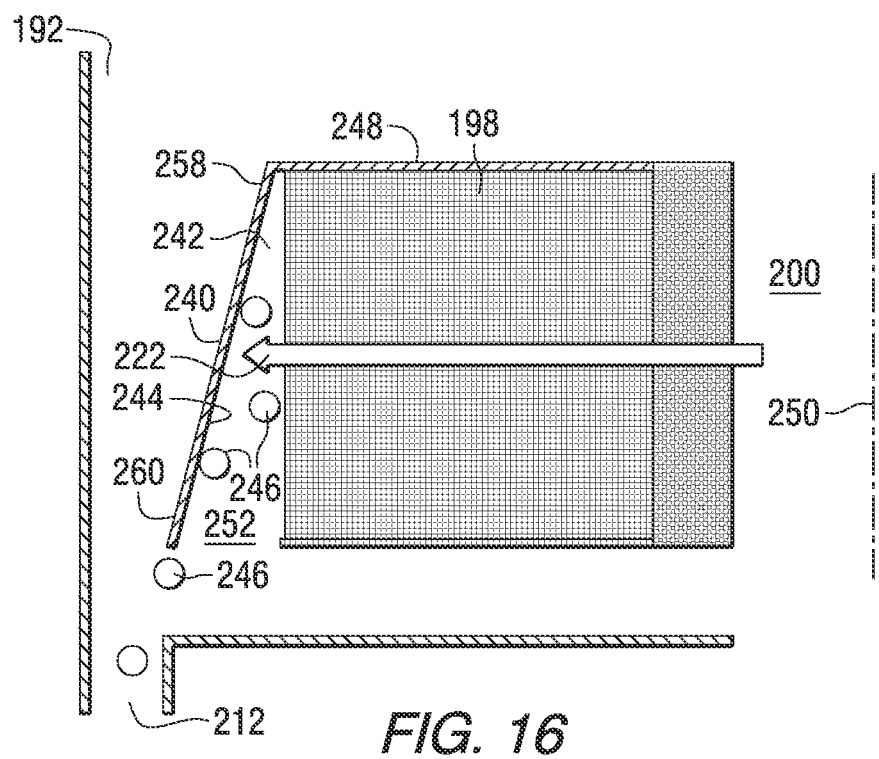
FIG. 16 is a schematic sectional view of a coalescing filter assembly.
Figure 17:
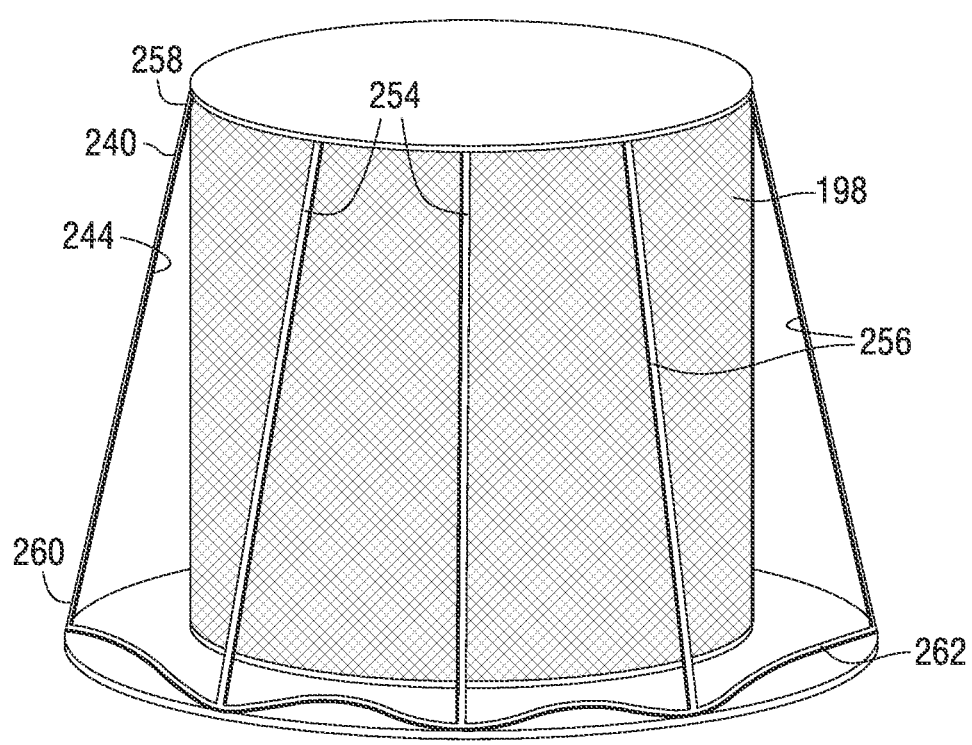
FIG. 17 is a schematic view of a coalescing filter assembly.

FIG. 16 shows another embodiment and uses like reference numerals from above where appropriate to facilitate understanding. An annular shroud 240 is provided along the exterior 242 of rotating coalescer filter element 198 and radially outwardly thereof and downstream thereof such that shroud 240 provides a collection and drain surface 244 along which separated oil drains as shown at droplets 246 after coalescence by rotating coalescer filter element 198. Shroud 240 is a rotating shroud and may be part of the filter frame or end cap 248. Shroud 240 circumscribes rotating coalescer filter element 198 and rotates about a common axis 250 therewith. Shroud 240 is conical and tapers along a conical taper relative to the noted axis. Shroud 240 has an inner surface at 244 radially facing rotating coalescer filter element 198 and spaced therefrom by a radial gap 252 which increases as the shroud extends axially downwardly and along the noted conical taper. Inner surface 244 may have ribs such as 254, FIG. 17, circumferentially spaced therearound and extending axially and along the noted conical taper and facing rotating coalescer filter element 198 and providing channeled drain paths such as 256 therealong guiding and draining separated oil flow therealong. Inner surface 244 extends axially downwardly along the noted conical taper from a first upper axial end 258 to a second lower axial end 260. Second axial end 260 is radially spaced from rotating coalescer filter element 198 by a radial gap greater than the radial spacing of first axial end 258 from rotating coalescer filter element 198. In a further embodiment, second axial end 260 has a scalloped lower edge 262, also focusing and guiding oil drainage.

Figure 18:
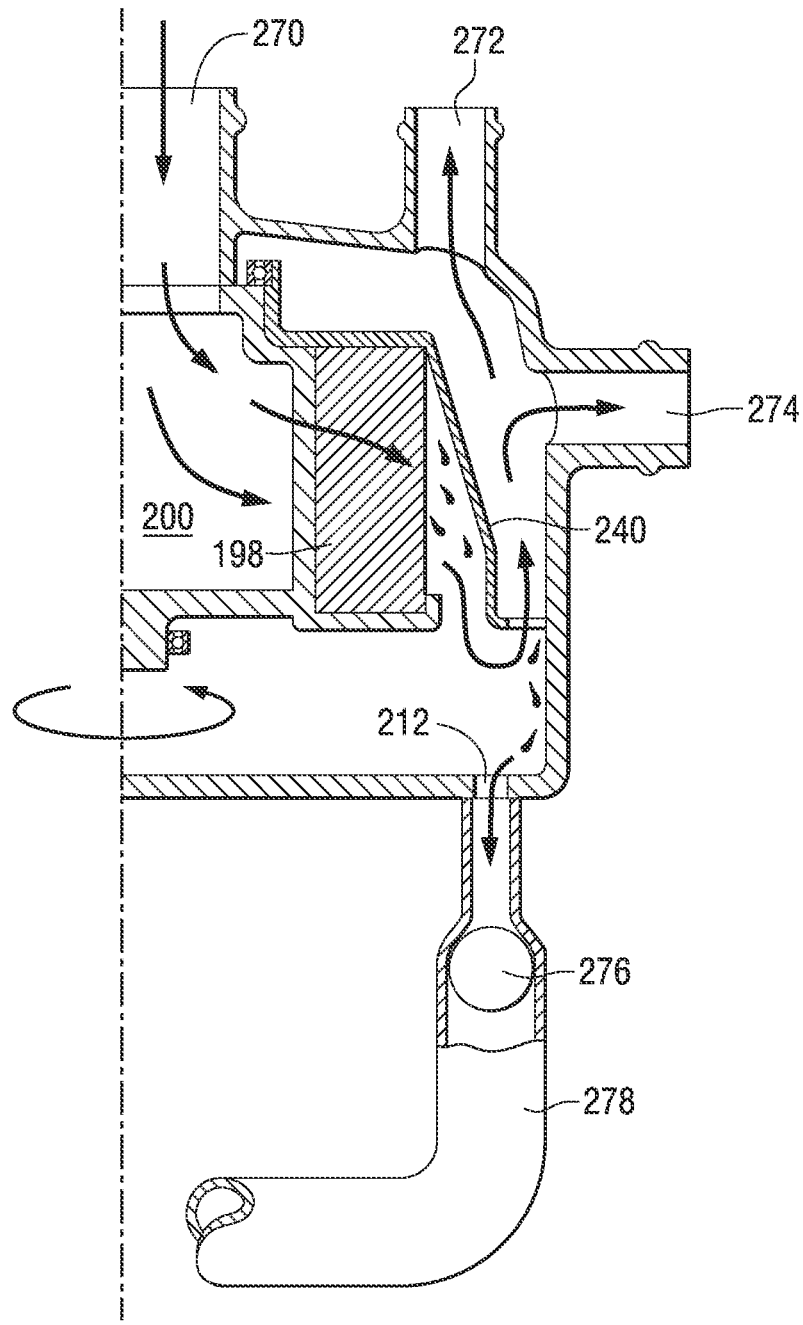
FIG. 18 is a schematic sectional view of a coalescing filter assembly.

FIG. 18 shows a further embodiment and uses like reference numerals from above where appropriate to facilitate understanding. In lieu of lower inlet 190, FIGS. 13-15, an upper inlet port 270 is provided, and a pair of possible or alternate outlet ports are shown at 272 and 274. Oil drainage through drain 212 may be provided through a one-way check valve such as 276 to drain hose 278, for return to the engine crankcase, as above.

Figure 19:
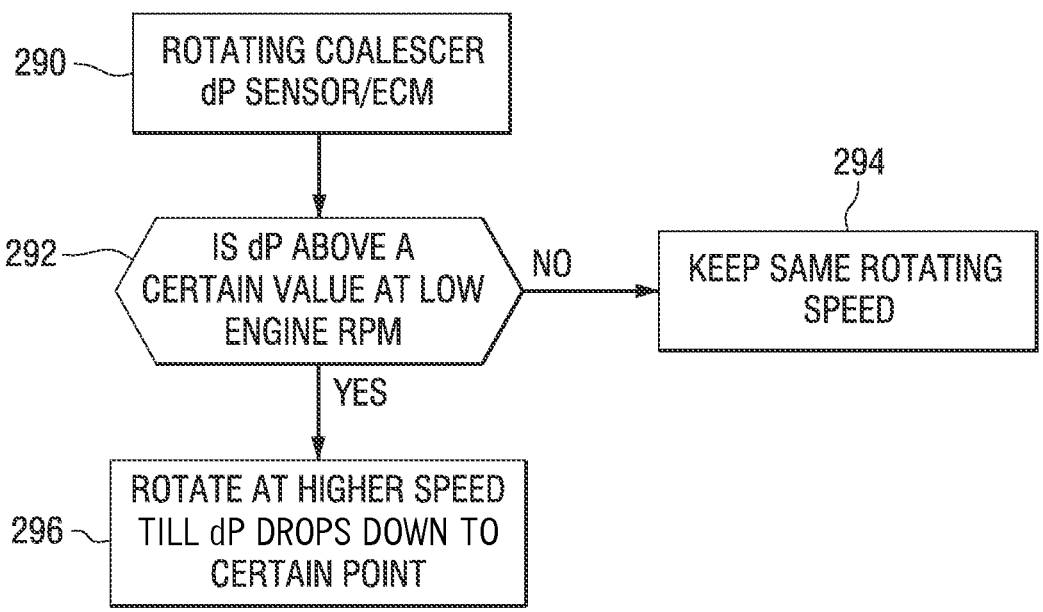
FIG. 19 is a schematic diagram illustrating a control system.

As above noted, the coalescer can be variably controlled according to a given condition, which may be a given condition of at least one of the engine, the turbocharger, and the coalescer. In one embodiment, the noted given condition is a given condition of the engine, as above noted. In another embodiment, the given condition is a given condition of the turbocharger, as above noted. In another embodiment, the given condition is a given condition of the coalescer. In a version of this embodiment, the noted given condition is pressure drop across the coalescer. In a version of this embodiment, the coalescer is a rotating coalescer, as above, and is driven at higher rotational speed when pressure drop across the coalescer is above a predetermined threshold, to prevent accumulation of oil on the coalescer, e.g. along the inner periphery thereof in the noted hollow interior, and to lower the noted pressure drop. FIG. 19 shows a control scheme wherein the pressure drop, dP, across the rotating coalescer is sensed, and monitored by the ECM (engine control module), at step 290, and then it is determined at step 292 whether dP is above a certain value at low engine RPM, and if not, then rotational speed of the coalescer is kept the same at step 294, and if dP is above a certain value then the coalescer is rotated at a higher speed at step 296 until dP drops down to a certain point. The noted given condition is pressure drop across the coalescer, and the noted predetermined threshold is a predetermined pressure drop threshold.

Figure 20:
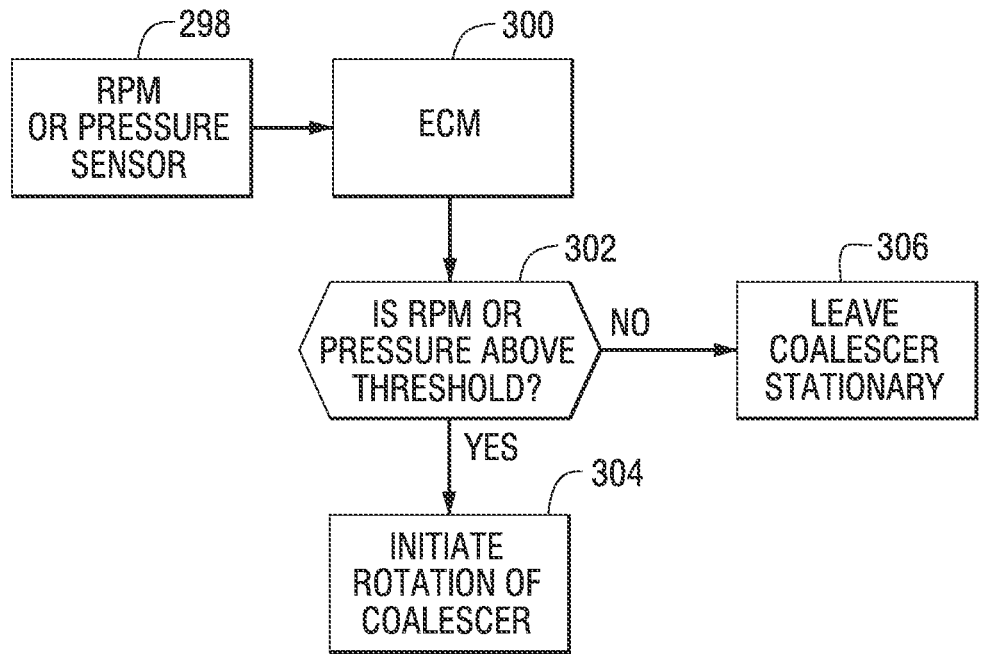
FIG. 20 is a schematic diagram illustrating a control system.
Figure 21:
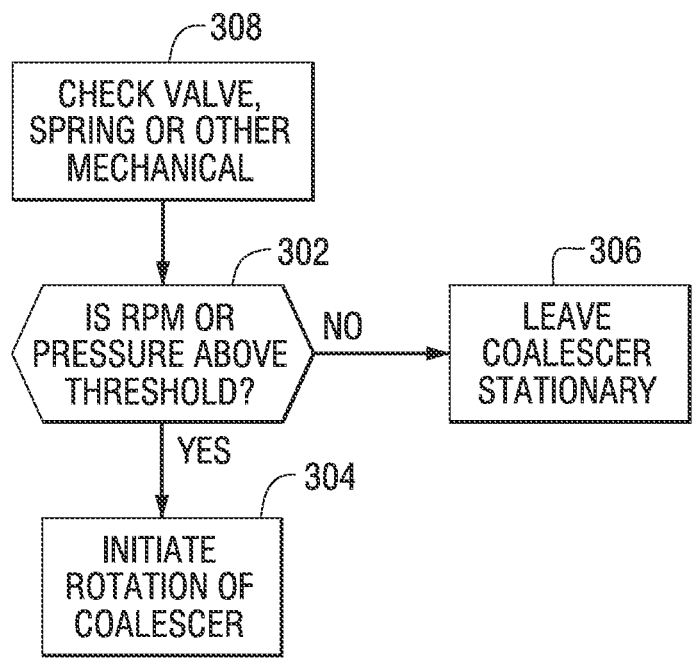
FIG. 21 is a schematic diagram illustrating a control system.

In a further embodiment, the coalescer is an intermittently rotating coalescer having two modes of operation, and is in a first stationary mode when a given condition is below a predetermined threshold, and is in a second rotating mode when the given condition is above the predetermined threshold, with hysteresis if desired. The first stationary mode provides energy efficiency and reduction of parasitic energy loss. The second rotating mode provides enhanced separation efficiency removing oil from the air in the blowby gas. In one embodiment, the given condition is engine speed, and the predetermined threshold is a predetermined engine speed threshold. In another embodiment, the given condition is pressure drop across the coalescer, and the predetermined threshold is a predetermined pressure drop threshold. In another embodiment, the given condition is turbocharger efficiency, and the predetermined threshold is a predetermined turbocharger efficiency threshold. In a further version, the given condition is turbocharger boost pressure, and the predetermined threshold is a predetermined turbocharger boost pressure threshold. In a further version, the given condition is turbocharger boost ratio, and the predetermined threshold is a predetermined turbocharger boost ratio threshold, where, as above noted, turbocharger boost ratio is the ratio of pressure at the turbocharger outlet vs. pressure at the turbocharger inlet. FIG. 20 shows a control scheme for an electrical version wherein engine RPM or coalescer pressure drop is sensed at step 298 and monitored by the ECM at step 300 and then at step 302 if the RPM or pressure is above a threshold then rotation of the coalescer is initiated at step 304, and if the RPM or pressure is not above the threshold then the coalescer is left in the stationary mode at step 306. FIG. 21 shows a mechanical version and uses like reference numerals from above where appropriate to facilitate understanding. A check valve, spring or other mechanical component at step 308 senses RPM or pressure and the decision process is carried out at steps 302, 304, 306 as above.

The noted method for improving turbocharger efficiency includes variably controlling the coalescer according to a given condition of at least one of the turbocharger, the engine, and the coalescer. One embodiment variably controls the coalescer according to a given condition of the turbocharger. In one version, the coalescer is provided as a rotating coalescer, and the method includes varying the speed of rotation of the coalescer according to turbocharger efficiency, and in another embodiment according to turbocharger boost pressure, and in another embodiment according to turbocharger boost ratio, as above noted. A further embodiment variably controls the coalescer according to a given condition of the engine, and in a further embodiment according to engine speed. In a further version, the coalescer is provided as a rotating coalescer, and the method involves varying the speed of rotation of the coalescer according to engine speed. A further embodiment variably controls the coalescer according to a given condition of the coalescer, and in a further version according to pressure drop across the coalescer. In a further version, the coalescer is provided as a rotating coalescer, and the method involves varying the speed of rotation of the coalescer according to pressure drop across the coalescer. A further embodiment involves intermittently rotating the coalescer to have two modes of operation including a first stationary mode and a second rotating mode, as above.

A method is provided for regenerating and cleaning the air-oil coalescer 28, 114, 198 of a crankcase ventilation system of an internal combustion engine 102 generating blowby gas 22, 104 in a crankcase 24, 106. The coalescer coalesces oil from the blowby gas. The method includes regenerating and cleaning the coalescer by intermittent rotation thereof.

Figure 22:
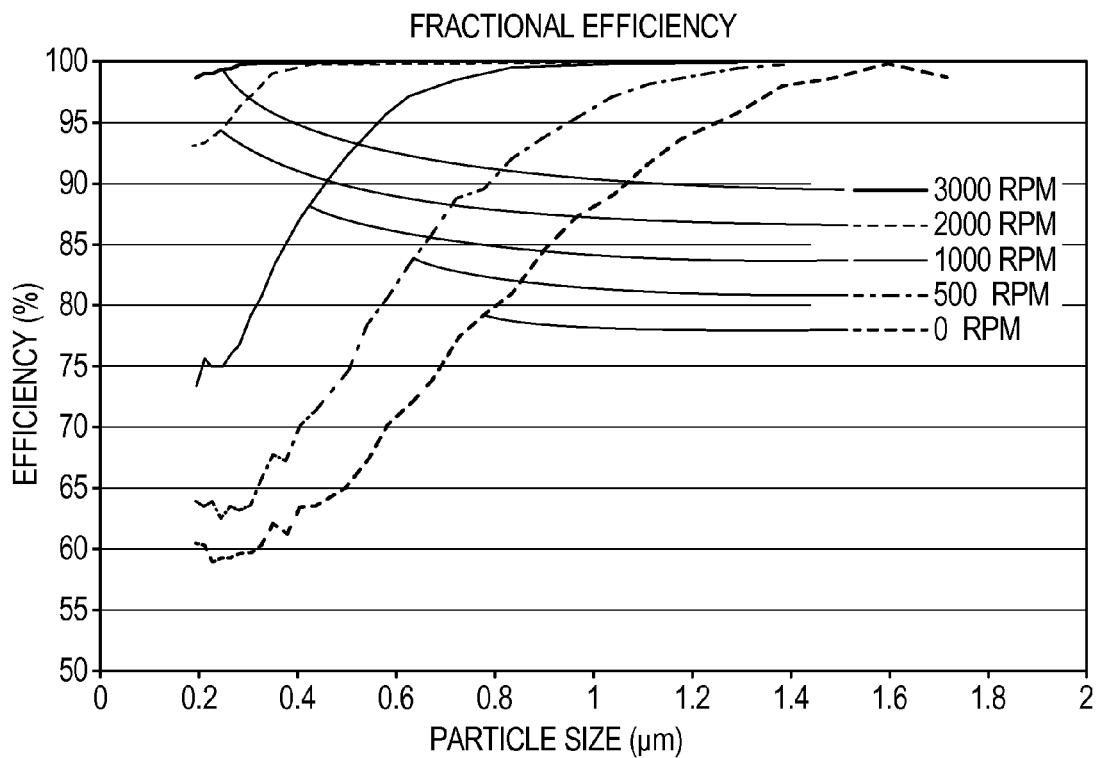
FIG. 22 is a graph showing efficiency vs. particle size.

FIG. 22 shows fractional efficiency vs. particle size. At particle size greater than about 1.5μ, efficiency is roughly the same, e.g. 100%, whether the coalescer filter is rotated or not. As particle size decreases, efficiency drops, particularly for lower RPM (revolutions per minute).

Figure 23:
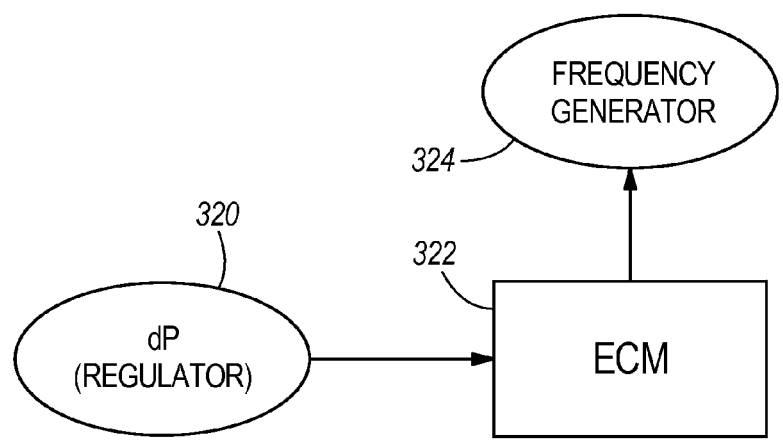
FIG. 23 shows a control system for intermittent operation.
Figure 24:
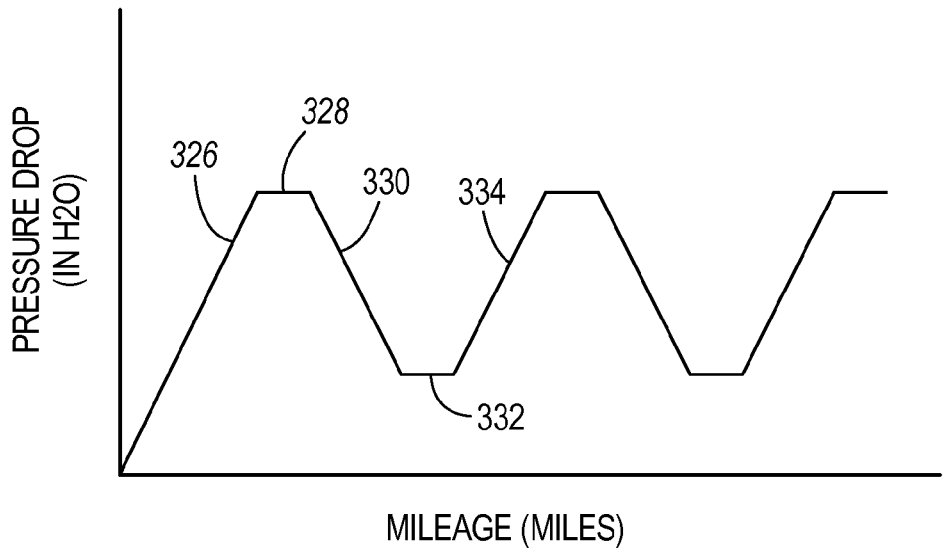
FIG. 24 shows one form of intermittent operation.
Figure 25:
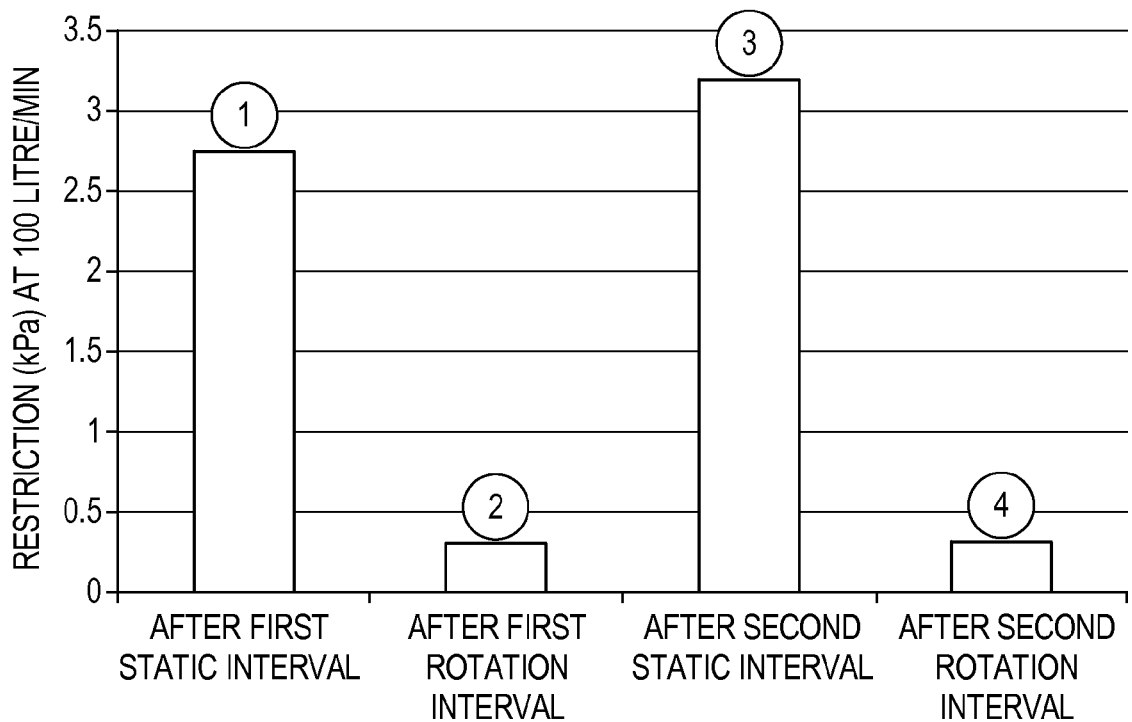
FIG. 25 is a graph showing restriction vs. flow.

FIG. 23 shows a control system including a pressure drop (dP) sensor or regulator 320 sensing pressure drop across the coalescer and sending a signal to the ECM 322 (engine control module) which in turn outputs a signal to a frequency generator or rotating unit 324 to rotate the coalescer when pressure drop across the latter rises above a given threshold. FIG. 24 illustrates intermittent operation wherein the coalescer is stationary at 326 and the pressure drop thereacross increases. When the pressure drop reaches a given threshold such as 328, the coalescer is rotated, and the pressure drop thereacross decreases as shown at 330. When the pressure drop reaches a lower threshold such as 332, the rotation is stopped. The pressure drop then begins increasing again at 334, and the cycle repeats. The coalescer is stationary during intervals such as 326, 334, during which pressure drop thereacross increases. The coalescer spins during intervals such as 330, during which the pressure drop thereacross decreases due to the cleaning and regenerating thereof, as the coalescer becomes unsaturated. FIG. 25 shows restriction levels of the same coalescer element after a series of static and rotating modes. The first bar indicates the restriction after 2000 hours of operation in a static mode. Rotating the coalescer reduces the restriction from bar 1 to bar 2, whereafter the rotation is stopped and the restriction increases from bar 2 to bar 3, whereafter the coalescer element is again rotated and the restriction decreases from bar 3 to bar 4. Various other intermittent operational patterns may be followed.

Regeneration of the coalescer by intermittent rotation retains high efficiency and clean coalescing filter media and low pressure drop for the life of the coalescer. The high efficiency is produced by efficiently draining the liquid from the filter media with intermittent rotation. Static coalescers have a finite life and must be serviced and replaced. Rotating coalescers, on the other hand, provide higher efficiency at a lower pressure drop than static coalescers and can potentially last the life of the engine, but require energy input to cause or drive the rotation, and may be more complex and costly from a first fit point of view. Customers are increasingly demanding a crankcase ventilation separator system that will last the life of the engine, provide high oil mist removal efficiency with low restriction, and with minimal to no parasitic energy loss from the engine. The coalescer fibrous media saturates with contaminants such as soot and oil in the engine crankcase ventilation blowby gas, reducing the life of the coalescer filter element. Fibrous polymer media traps the oil within the fiber matrix, and the build-up of trapped oil ultimately results in a saturated coalescer element condition which raises the crankcase pressure to the point where the coalescer element needs to be changed. Intermittent rotation extends coalescer filter life and reduces parasitic energy loss otherwise needed to accomplish continuous rotation.

The present method regenerates and cleans the coalescer by applying centrifugal force thereto by intermittent rotation thereof. In one embodiment, the intermittent rotation is controlled according to a given parameter. In one embodiment, the given parameter is a condition of the coalescer. In one embodiment, the given parameter is a condition of the engine. In one embodiment, the given parameter is crankcase pressure of the engine. In one embodiment, the given parameter is operational service time of the engine. In one embodiment, the given parameter is mileage of a vehicle driven by the engine.

In one embodiment, the method includes regenerating and cleaning the coalescer by intermittent operation driven by a rotary shaft. In one embodiment, the rotary shaft is driven by the engine. In one embodiment, the method includes regenerating and cleaning the coalescer by intermittent rotation driven by an electric motor. In one embodiment, the method includes regenerating and cleaning the coalescer by intermittent rotation driven by a hydraulic motor. In one embodiment, the method includes regenerating and cleaning the coalescer by intermittent rotation driven by pressurized engine oil. In one embodiment, the method includes regenerating and cleaning the coalescer by intermittent rotation driven by pressurized engine oil driving a pelton turbine. In one embodiment, the engine has an oil pump pumping lubricating oil to components of the engine, and the method includes regenerating and cleaning the coalescer by intermittent rotation driven by pumped oil from the oil pump. In one embodiment, the oil pump has a relief valve returning excess oil to a sump to protect against overpressure, and the method includes regenerating and cleaning the coalescer by intermittent rotation driven by excess oil from the relief valve.

In one embodiment, the method includes regenerating and cleaning the coalescer by intermittent rotation commanded when to spin and when not to spin. In one embodiment, the method includes regenerating and cleaning the coalescer by intermittent rotation at a commanded frequency having a plurality of cycles, each cycle having an off interval during which the coalescer is stationary and nonrotated, and an on interval during which the coalescer is rotated. In one embodiment, at least one of a) the commanded frequency, b) the duty cycle of the commanded frequency between the off and on intervals, and c) the speed of rotation during the on interval, is controlled according to a given parameter. In one embodiment, during the on interval, the method includes pulsing the rotation of the coalescer to provide pulsed rotation thereof, including a plurality of centrifugal force impulses thereto during rotation during the on interval. In one embodiment, during the on interval, the method includes pulsing the rotation of the coalescer to provide a plurality of accelerational bursts during rotation thereof. In one embodiment, the method includes regenerating and cleaning the coalescer by intermittent rotation while the coalescer is mounted to the engine.

In one embodiment, the noted given parameter or trigger for rotation is excess oil flow from the noted relief valve of the oil pump. In this embodiment, rotation of the coalescer takes place only when the system oil pressure reaches a higher or excess level above that needed to lubricate engine components, and thus the coalescer rotational system would not "steal" oil from the lube system otherwise needed at lower engine RPMs or system pressures. In another embodiment, the parameter or trigger for coalescer rotation is crankcase pressure. In one embodiment, the coalescer element is integrated with a pressure sensor on a rotating driveshaft, with the sensor sensing pressure drop across the coalescer media.

In the foregoing description, certain terms have been used for brevity, clarity, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims. Each limitation in the appended claims is intended to invoke interpretation under 35 U.S.C. §112, sixth paragraph, only if the terms "means for" or "step for" are explicitly recited in the respective limitation.

What is claimed is:

1. A method for regenerating and cleaning an air-oil coalescing filter of a crankcase ventilation system of an internal combustion engine generating blowby gas in a crankcase, the air-oil coalescing filter comprising coalescing filter media, the air-oil coalescing filter coalescing oil from the blowby gas, the method comprising regenerating and cleaning the air-oil coalescing filter by applying centrifugal force thereto by intermittent rotation thereof, the intermittent rotation applied based upon a given parameter associated with at least one of the air-oil coalescing filter and a turbocharger associated with the internal combustion engine.

2. The method according to claim 1, wherein the given parameter is based upon a condition of the air-oil coalescing filter.

3. The method according to claim 1, wherein the given parameter is based upon a pressure drop across the air-oil coalescing filter.

4. The method according to claim 1, wherein the air-oil coalescing filter is regenerated and cleaned by intermittent rotation driven by a rotary shaft driven by the internal combustion engine.

5. The method according to claim 1, wherein the air-oil coalescing filter is regenerated and cleaned by intermittent rotation driven by an electric motor.

6. The method according to claim 1, wherein the air-oil coalescing filter is regenerated and cleaned by intermittent rotation driven by a hydraulic motor.

7. The method according to claim 1, wherein the air-oil coalescing filter is regenerated and cleaned by intermittent rotation driven by pressurized engine oil.

8. The method according to claim 1, wherein the air-oil coalescing filter is regenerated and cleaned by intermittent rotation driven by pressurized engine oil driving a pelton turbine.

9. The method according to claim 1, wherein the air-oil coalescing filter is regenerated and cleaned by intermittent rotation driven by pumped oil from an oil pump of the internal combustion engine that pumps lubricating oil to components thereof.

10. The method according to claim 1, wherein the given parameter is based upon turbocharger efficiency.

11. The method according to claim 1, wherein the given parameter is based upon turbocharger boost pressure.

12. The method according to claim 1, wherein the given parameter is based upon turbocharger boost ratio, the turbocharger boost ratio being a ratio of pressure at an outlet of the turbocharger versus an inlet of the turbocharger.

13. A method for regenerating and cleaning an air-oil coalescer of a crankcase ventilation system of an internal combustion engine generating blowby gas in a crankcase, the air-oil coalescer coalescing oil from the blowby gas, the method comprising regenerating and cleaning the air oil coalescer by intermittent rotation thereof,
wherein the internal combustion engine has an oil pump pumping lubricating oil to components of the internal combustion engine and having a relief valve returning excess oil to a sump to protect against overpressure, and wherein the regenerating and cleaning of the air-oil coalescer by intermittent rotation is driven by excess oil flow from the relief valve.

14. A system for regenerating and cleaning an air-oil coalescing filter of a crankcase ventilation system of an internal combustion engine generating blowby gas in a crankcase, the air-oil coalescing filter comprising coalescing filter media, the air-oil coalescing filter coalescing oil from the blowby gas, the system regenerating and cleaning the air-oil coalescing filter by applying centrifugal force thereto by intermittent rotation thereof, wherein the intermittent rotation is controlled by a controller according to a given parameter associated with at least one of the air-oil coalescing filter and a turbocharger associated with the internal combustion engine.

15. The system according to claim 14, wherein the given parameter is based upon a condition of the air-oil coalescing filter.

16. The system according to claim 14, wherein the given parameter is based upon a pressure drop across the air-oil coalescing filter.

17. The system according to claim 14, wherein the air-oil coalescing filter is regenerated and cleaned by intermittent rotation driven by a rotary shaft driven by the internal combustion engine.

18. The system according to claim 14, wherein the air-oil coalescing filter is regenerated and cleaned by intermittent rotation driven by an electric motor.

19. The system according to claim 14, wherein the air-oil coalescing filter is regenerated and cleaned by intermittent rotation driven by a hydraulic motor.

20. The system according to claim 14, wherein the air-oil coalescing filter is regenerated and cleaned by intermittent rotation driven by pressurized engine oil.

21. The system according to claim 14, wherein the air-oil coalescing filter is regenerated and cleaned by intermittent rotation driven by pressurized engine oil driving a pelton turbine.

22. The system according to claim 14, wherein the air-oil coalescing filter is regenerated and cleaned by intermittent rotation driven by pumped oil from an oil pump of the internal combustion engine that pumps lubricating oil to components thereof.

23. The system according to claim 14, wherein the given parameter is based upon turbocharger efficiency.

24. The system according to claim 14, wherein the given parameter is based upon turbocharger boost pressure.

25. The system according to claim 14, wherein the given parameter is based upon turbocharger boost ratio, the turbocharger boost ratio being a ratio of pressure at an outlet of the turbocharger versus an inlet of the turbocharger.

26. A system for regenerating and cleaning an air-oil coalescer of a crankcase ventilation system of an internal combustion engine generating blowby gas in a crankcase, the air-oil coalescer coalescing oil from the blowby gas, the system regenerating and cleaning the air-oil coalescer by intermittent rotation thereof,
wherein the engine has an oil pump pumping lubricating oil to components of the internal combustion engine and having a relief valve returning excess oil to a sump to protect against overpressure, and wherein the system regenerates and cleans the air-oil coalescer by intermittent rotation driven by excess oil flow from the relief valve.

* * * * *